United States Patent [19]

Scoles et al.

[11] Patent Number: 4,907,224

[45] Date of Patent: Mar. 6, 1990

[54] METHOD FOR TRANSMITTING DATA IN MULTIPLE ACCESS DATA COMMUNICATIONS NETWORKS

[75] Inventors: Bruce D. Scoles; Jay W. Bernasek, both of Helena; Byron J. Botts; Cherice Jobmann, both of Bozeman; John J. Schneider, Jr., Willow Creek, all of Mont.; Gary A. Stornelli, Hamburg; Cheryl L. White, Penfield, both of N.Y.; Robert L. Wall, Bozeman, Mont.

[73] Assignee: Bydatel Corporation, Buffalo, N.Y.

[21] Appl. No.: 920,013

[22] Filed: Oct. 17, 1986

[51] Int. Cl.$^4$ .............................................. H04J 3/02
[52] U.S. Cl. ................................ 370/85.2; 340/825.51
[58] Field of Search .......................... 370/85, 89, 94; 340/825.5, 825.51, 825.52

[56] References Cited

U.S. PATENT DOCUMENTS

| | | | |
|---|---|---|---|
| 3,639,904 | 2/1972 | Arulpragasam | 370/89 |
| 4,227,178 | 10/1980 | Gergaud et al. | 370/85 |
| 4,342,955 | 8/1982 | Shima | 370/85 |
| 4,387,425 | 6/1983 | El-Gohary | 370/85 |
| 4,511,958 | 4/1985 | Funk | 370/85 |
| 4,661,905 | 4/1987 | Bomba et al. | |

Primary Examiner—Joseph A. Orsino
Assistant Examiner—Frank M. Scutch, III
Attorney, Agent, or Firm—Finnegan, Henderson, Farabow, Garrett & Dunner

[57] ABSTRACT

A method for transmitting data in packet switching networks provides a Collision-Eliminating Multiple Access protocol in which nodes desiring to transmit over the network channel transmit reservation requests during a plurality of contention slots, the number of contention slots being dynamically controlled according to network load. A node designated to next obtain control of the channel receives the identifiers of nodes transmitting reservation requests and, prior to transmitting application data, transmits network control data consisting of the identifiers of nodes from whom successful reservation requests were successfully received. The transmitted identifiers are received and stored by each node in an identical queue, whereby subsequent control of the channel is rotated based on the order of node identifiers appearing in an identical queue on each node. The transmitted network control data includes reservation requests received during a previous contention slot period, queue correction information, and the identifiers of nodes from which the controlling node expects to receive data.

20 Claims, 19 Drawing Sheets

Fig. 3

STANDARD PACKET FORMAT

| FLAG | LINK ID | PACKET TYPE ID | DATA | CRC | FLAG |
|------|---------|----------------|------|-----|------|

Fig. 4

STANDARD PACKET TYPES

| PACKET ID | PACKET TYPE |
|-----------|-------------|
| A | ARBITRATION |
| C | CONNECT |
| D | DATA |
| H | ALOHA |
| I | INITIATION |
| R | ALOHA RESPONSE |

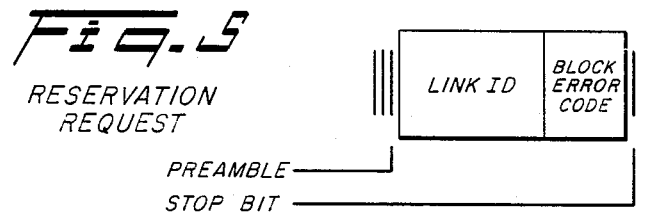
Fig. 5 RESERVATION REQUEST
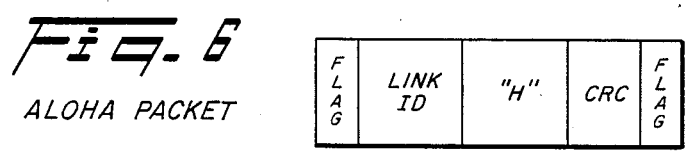
Fig. 6 ALOHA PACKET
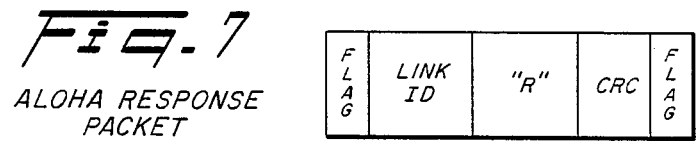
Fig. 7 ALOHA RESPONSE PACKET
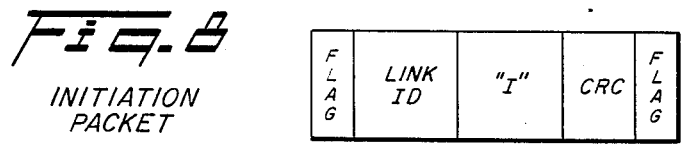
Fig. 8 INITIATION PACKET
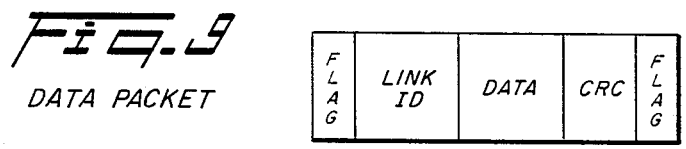
Fig. 9 DATA PACKET

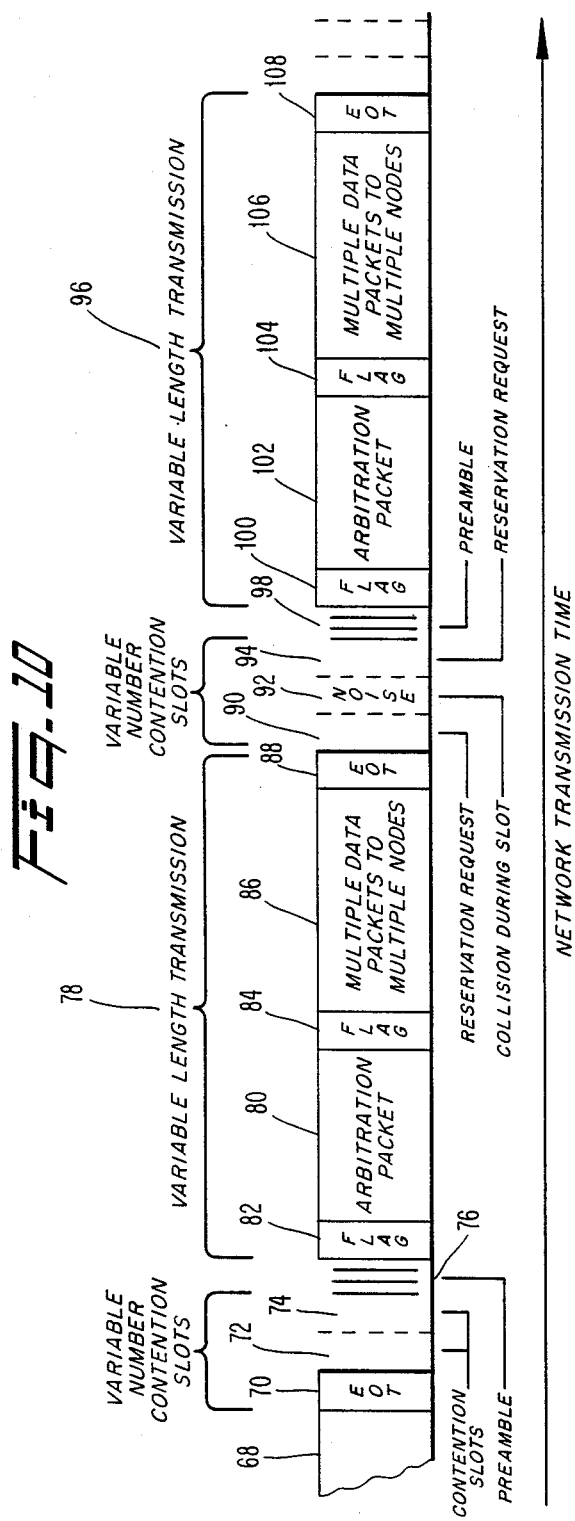

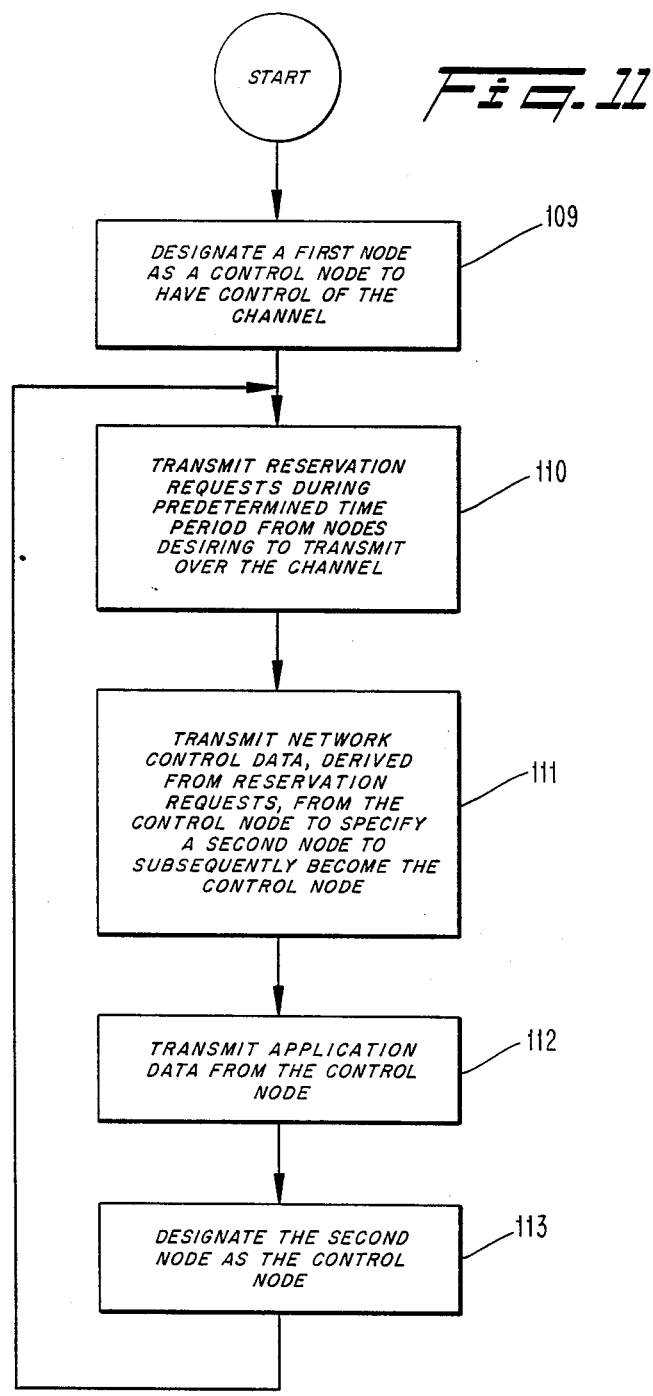

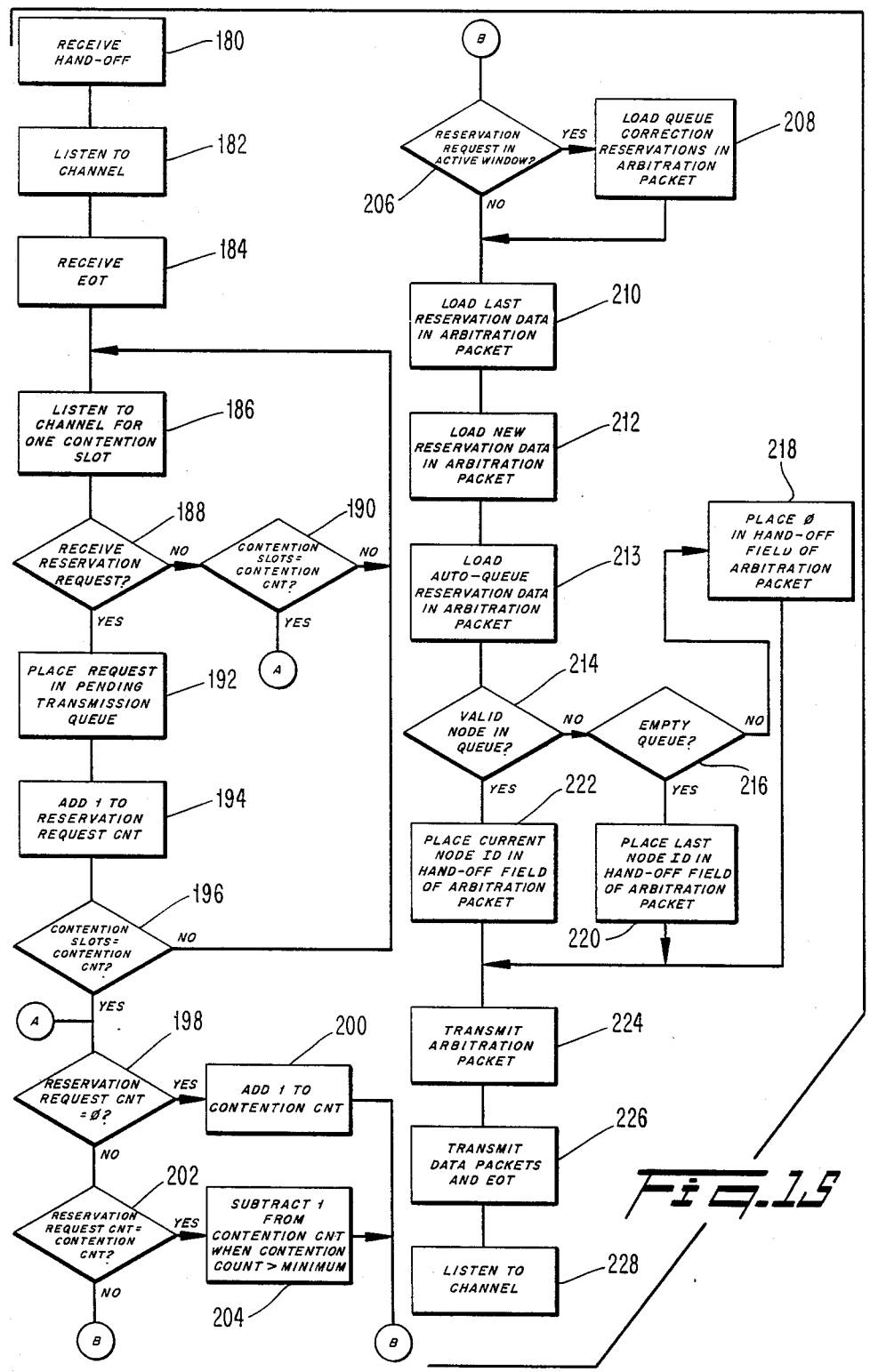

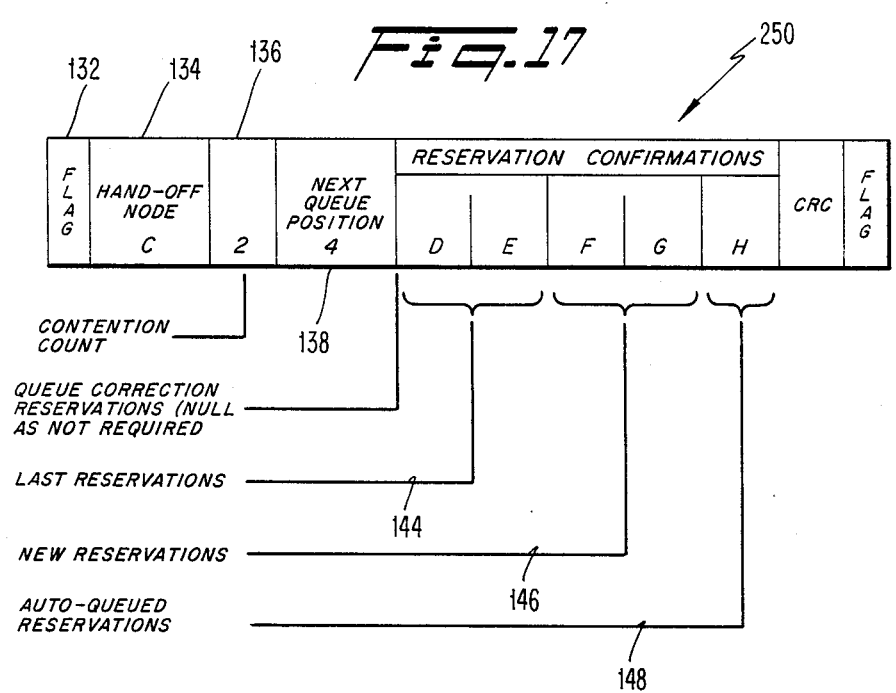

Fig. 18
| QUEUE NUMBER | TRANSMISSION ID |
|---|---|
| 1 | |
| 2 | |
| 3 | C |
| 4 | D |
| 5 | E |
| 6 | F |
| 7 | G |
| 8 | H |
| ⋮ | • |
| 254 | • |
| 255 | • |
Rows 3–8 : ACTIVE WINDOW
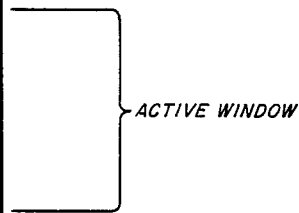
Fig. 24
| I/O PORT | LINK ID | CIRCUIT NUMBER |
|---|---|---|
| 0 | A' | 1 |
| 1 | B' | 1 |
| 2 | C' | 2 |
| 3 | D' | 3 |
Fig. 19
| QUEUE NUMBER | TRANSMISSION ID |
|---|---|
| 1 | |
| 2 | |
| 3 | |
| 4 | D |
| 5 | E |
| 6 | F |
| 7 | G |
| 8 | H |
| ⋮ | • |
| 254 | • |
| 255 | • |
Row 3: ←HOLE
Rows 3–8: ACTIVE WINDOW
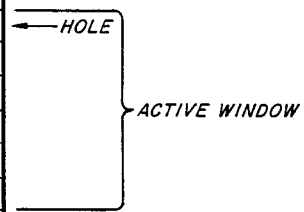

METHOD FOR TRANSMITTING DATA IN MULTIPLE ACCESS DATA COMMUNICATIONS NETWORKS

BACKGROUND OF THE INVENTION

The invention relates to a method for transmitting data and, more particularly, to a method for transmitting data among a plurality of data communication devices connected in a network.

It is often desired to provide the capability for various types of data processing devices to communicate with one another. For example, computers at branch offices of a company are often interconnected to allow each computer to have access to data generated by every other computer. Other examples of interconnected data processing devices include automatic teller machine networks now operated by many financial institutions. In each case, the data processing device is connected to a data communication device to form a node, which is in turn interconnected to other nodes through a communications channel to form a network. The nodes communicate over the network according to a data communication protocol, which is a set of rules by which a network of data communication devices clustered into nodes communicate with each other in an orderly and accurate fashion.

A simple data communication protocol is used in point to point systems wherein one node transmits a message to another node at the other end of a data circuit and waits for an intelligible response confirming the reception of the message before sending another message. Such protocol is known as a basic Stop and Wait Protocol.

When more than two nodes must communicate with each other over a single media or channel (e.g. wire, radio frequencies, or fiber optics), a more sophisticated protocol must be devised to control the loss of network throughput caused by transmission collision. Transmission collision occurs when multiple nodes contend for (i.e., attempt to gain access to) a network simultaneously, therebY damaging all messages transmitted. This transmission collision requires re-transmission of data, with a resulting loss of network efficiency. Such loss of efficiency is especially critical in data networks which, unlike voice networks, operate without human intervention to detect network contention, since a prime objective of most data networks is to transmit the most amount of data over the network in the least amount of time.

Several sophisticated protocols have been developed to avoid data collision. The most common techniques include various forms of carrier sensing, or alternatively, the application of arbitration techniques.

Carrier sensing is a technique that requires all nodes on a network to listen to a channel and to determine if a carrier signal is present (indicating that the channel is being used) before transmitting a message over the network. If a carrier signal is detected, a node will not concurrently transmit its data. Arbitration is a mathematical algorithm which defines the order and/or the number of occurrences of transmission over a channel.

Carrier sensing techniques can only be used effectively when all nodes on the network can listen to the channel and can distinguish the difference between data transmission and an empty channel. Such techniques have been applied to data communication over all media, but have been perfected for and implemented largely by wire based networks. A prime example of this type of protocol is the Carrier Sensing Multiple-Access with Collision Detection (CSMA/CD) protocol as used by the Ethernet network.

Although carrier sensing over terrestrial Radio Frequency (RF) networks is possible, the hardware necessary to assure optimum network efficiency under peak load is not usually cost effective. When carrier sensing is not effective or practical, or when a carrier sensing protocol is not possible (as in satellite communication), arbitration protocol must be employed.

Most prior art arbitration protocol for multi-point, nonwire network media have been defined almost exclusively for satellite transmission and have unique properties specific to the application. These protocol are often limited in efficiency when applied to terrestrial RF networks because they are designed to accommodate the long transmission time delaYs inherent in satellite links. When applied to terrestrial RF multi-point networks in which time delays are not inherent, these protocol reduce network data throughput.

Arbitration-based protocol which can be used on terrestrial RF networks are not usually efficient under peak network loads for a varietY of reasons, dominant of which are restrictions on size and timing of transmissions.

Some prior art protocol were designed for satellite communication and use fixed transmission slots and fixed length packets. Because they were designed to meet the special needs of satellite communication, they are not efficient on terrestrial networks because of less than optimal network throughput. Terrestrial RF networks using these protocol can only be expected to perform at between 30% and 50% of theoretical network maximums. An example of such a satellite protocol is that described in *Bram*. "Broadcast Recognition Access Method", IEEE Transaction Communications, Vol. COM-27, Aug., 1979; pp. 1183–1190.

An example of such a protocol applied to terrestrial radio systems is the Aloha Protocol developed at the University of Hawaii for terrestrial radio networks. Aloha protocol uses a "talk whenever you want to" approach in which each node transmits without regard for other transmissions and no attempt is made to avoid collisions. Using this protocol, network saturation occurs at 18% of theoretical maximum network throughput.

Slotted Aloha, also developed at the University of Hawaii for terrestrial radio networks is an enhanced version of the Aloha Protocol. This protocol is similar to satellite protocol in that it uses fixed transmission time slots and fixed length packets. Network saturation occurs at 36% of maximum network utilization.

Carrier Sensing Multiple-Access protocol without Collision Detection (CSMA) attempts to avoid collision bY applying a transmission delay after detecting a transmission. This delay reduces network efficiencY in proportion to the delaYing factor. Channel throughput can be expected to be 56% to 86% with the average saturation of an RF network occurring at the low end of the throuqhput range. This is a result of the additional time it takes to turn on an RF transmitter, sYnchronize it, and turn it off. An RF network utilizing a repeater can be expected to perform at approximately half the maximum expectations.

Carrier Sensing Multiple-Access protocol with Collision Detection (CSMA/CD—the protocol used by Ethernet) places practical limitations on packet size, somewhat reducing the efficiency of the network. In an environment where collision detection is possible (e.g. wire networks) this protocol can be expected to perform at 81% of the theoretical maximum. In an RF network, however, this protocol is impractical due to the expense of the equipment necessary to perform collision detection.

It is therefore an object of the present invention to provide a method of data transmission having high network efficiency under network load when applied to an RF network.

It is another object of the invention to provide a method of data transmission which does not restrict transmission of data to positionally predetermined transmission slots.

It is yet another object of the invention to provide a method of data transmission which does not impose a restrictions on transmission length or the number of packets per transmission.

It is yet a further object of the invention to provide a method of data transmission which can be economically applied to an RF network.

It is yet a further object of the invention to provide a method of data transmission which would increase the efficiency of an RF terrestrial network by boosting data throughput ratios.

SUMMARY OF THE INVENTION

These and other objects of the invention are provided in a method for transmitting application data between a plurality of communication nodes each having a unique identifier, the nodes being interconnected via a communications channel to form a network. The method comprises the steps of designating a first node to have control of said channel, transmitting Reservation Requests during a predetermined time period from all nodes desiring to transmit over the channel, transmitting network control data from the first node to specify a second node to obtain subsequent control of the channel, transmitting application data from said first node, and transmitting network control data and application data from said second node.

The method maximizes the percentage of time devoted to transmission of application data and minimizes the amount of time in which nodes contend for the channel. The present invention thus achieves a data throughput ratio of 85% of the theoretical maximum when applied to anY RF network and even higher efficiency ratios on other media.

BRIEF DESCRIPTION OF THE DRAWINGS

FIG. 3 is a diagram of a standard packet of data which may be transmitted using the present invention;

FIG. 4 is a table showing the types of packets which may be transmitted, using the present invention;

FIG. 5 is a diagram showing the structure of a Reservation Request;

FIG. 6 is a diagram showing the structure of an Aloha packet;

FIG. 7 is a diagram showing the structure of an Aloha Response packet;

FIG. 8 is a diagram showing the structure of an Initiation Packet;

FIG. 9 is a diagram showing the structure of an Application Data packet;

FIG. 10 is a timing diagram showing typical activity on the network of FIG. 1;

FIG. 11 is a logic flow chart of the present invention;

FIG. 15 is a logic flow diagram showing the activity of a hand-off node in a preferred embodiment of the present invention;

FIG. 16 is a diagram of a Pending Transmission Queue stored in nodes of the network of FIG. 1;

FIG. 17 is a diagram showing the contents of an Arbitration Packet during typical operation of the network of FIG. 1;

FIG. 18 is a diagram showing the contents of the Pending Transmission Queue of FIG. 16 after reception of an Arbitration Packet;

FIG. 19 is a diagram showing the contents of the Pending Transmission Queue of FIG. 18 after unsuccessful reception of a subsequent Arbitration Packet;

FIG. 24 is a diagram of a Link Identifier Table used in a preferred embodiment of the present invention;

DESCRIPTION OF THE PREFERRED EMBODIMENT

In a preferred embodiment, the present invention provides a method for transmitting application data between a plurality of nodes each having a unique identifier, the nodes being interconnected via a communications channel to form a network. The method may be referred to as a Collision Eliminating Multiple Access Protocol (CEMA) for packet switched data networks.

CEMA is a multi-user, multi-circuit communication protocol which allows multiple nodes to communicate with each other in a systematic and controlled manner over a variety of media (wire, RF, or fiber optics). The protocol optimizes network throughput by eliminating data transmission collision, bY supporting variable packet sizes, and by allowing flexible transmission time frames. Network control is shared by all active nodes, each of which has a unique identifier (ID). In the preferred embodiment, all nodes on the network listen to all transmissions on a network.

Figure 1:
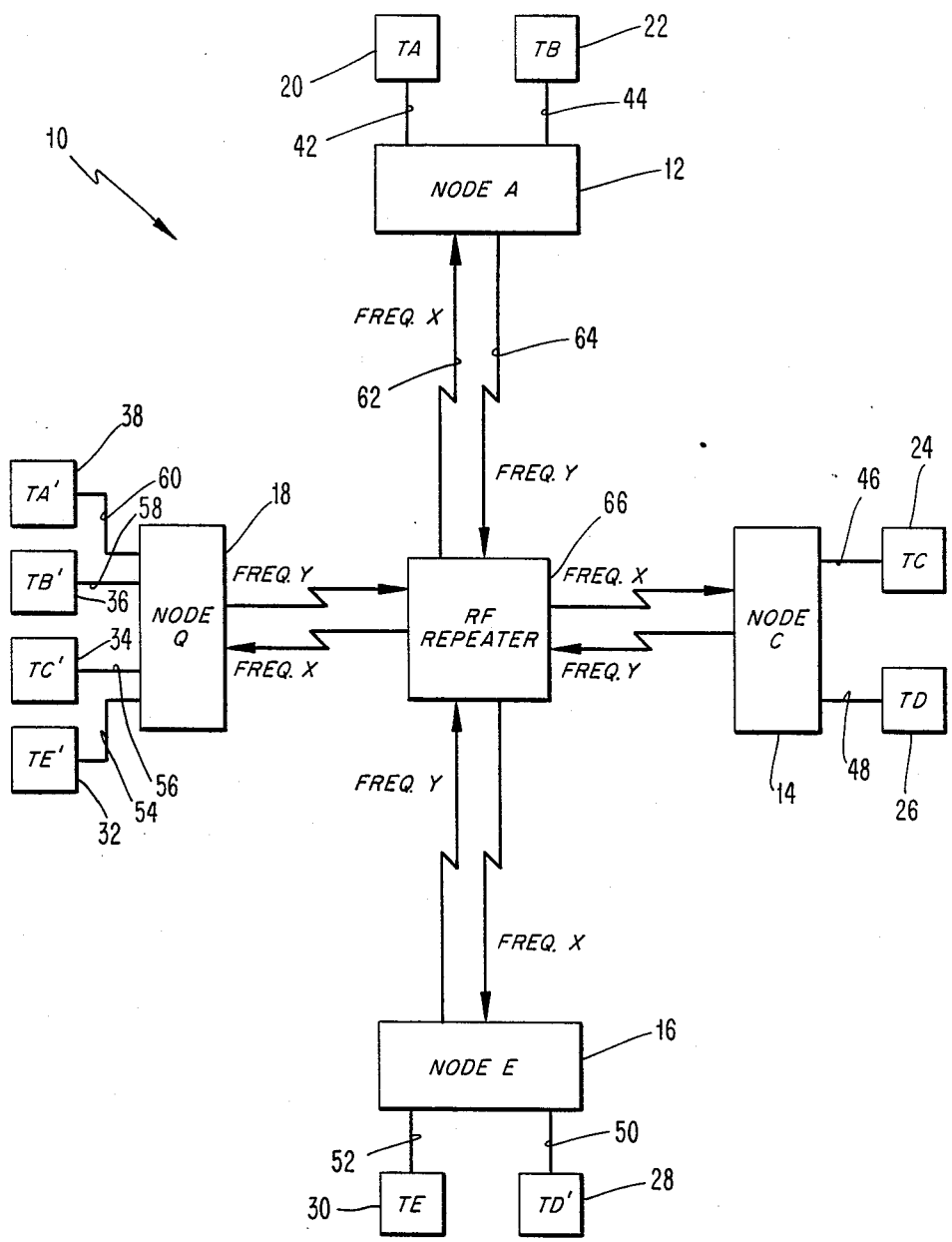
FIG. 1 is a block diagram of a typical network configuration which may employ a preferred embodiment of the present invention.

Referring to the drawings, FIG. 1 shows a network 10 which may include a preferred embodiment of the present invention. Network 10 includes nodes A, C, E, and Q configured in a single full-duplex environment. In this embodiment, all nodes communicate by transmitting data through a centrally located radio repeater 66 which allows each node to listen on frequency X and transmit on frequency Y.

As can be seen in FIG. 1, nodes A, C, E, and Q have connected thereto a plurality of terminals 20, 22, 24, 26, 28, 30, 32, 34, 36, and 38. Terminals 20-38 are connected to their respective nodes and may constitute any desired type of data processing device such as, for example, mainframe computers, personal computers, terminals, automatic teller machines, etc. Nodes A, C, E, and Q communicate with each other over a communications channel consisting of a pair of terrestrial radio channels 62 and 64 on frequencies X and Y, respectively, through repeater 66. Each node A, C, E, and Q transmits on the same frequency, frequency Y as shown in FIG. 1. Repeater 66 includes a receiver, transmitter, and associated control circuitry to receive all signals on frequency Y and simultaneously and automatically retransmit such signals over frequency X. In this manner, a transmission from any node over frequency Y will simultaneously and automatically be received by all other nodes over frequency X.

Figure 2:
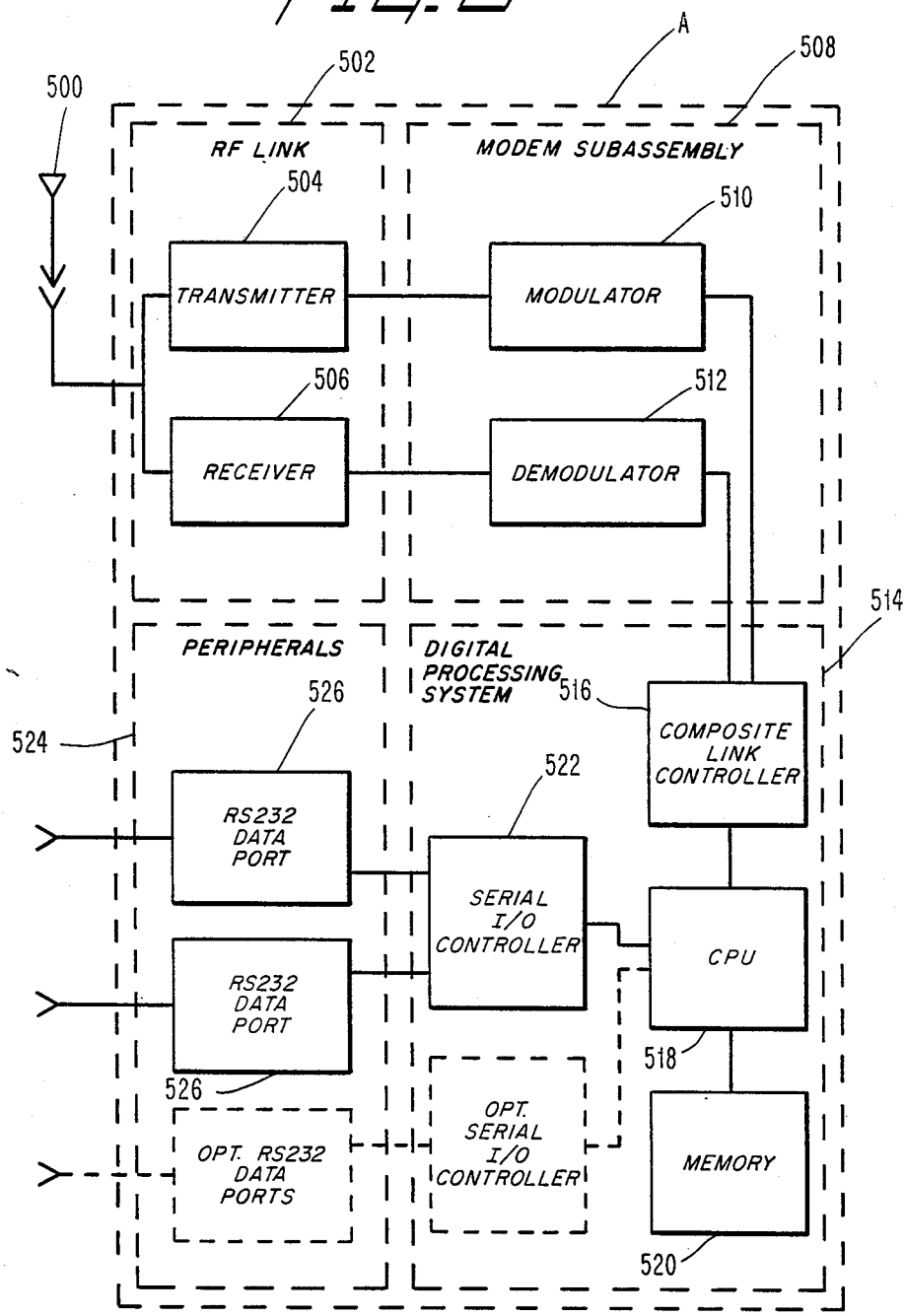
FIG. 2 is a block diagram of a node of FIG. 1.

In the preferred embodiment, each node consists of a plurality of modules as shown in FIG. 2. Node A includes an antenna 500 connected to an RF link 502 which consists of a transmitter 504 and a receiver 506. RF link 502 is connected to a modem assembly 508 including a modulator 510 and a demodulator 512. Modem assembly 508 is connected to a digital processing system 514 through a composite link controller 516. Controller 516 is connected to a central processing unit (CPU) 518 including a memory system 520. CPU 518 is also connected through a serial input/output (I/O) controller 522 to a peripheral subassembly 524 which in the preferred embodiment comprises a plurality of RS 232 data ports 526. Each data port 526 is connected to a terminal, which may be a data processor such as, for example, a computer, intelligent terminal, automatic teller machine, etc. In the preferred embodiment, node A comprises a type BDM-1000 digital data communications device commercially available from Bydatel Corporation of Buffalo, N.Y.

All data transmitted through network 10 is transmitted in the form of data packets of a standard format shown generally, in FIG. 3 and in more detail in FIGS. 5-9, 17, and 27. As illustrated, each packet contains a start flag, a transmission link ID, packet type ID, data, an error control field, and a terminate flag. The protocol recognizes six types of packets as shown in FIG. 4: Arbitration, Connect, Data, Aloha, Initiation, and Aloha Response. Depending on the length of the data portion of the packet, packets can vary significantly in length under this protocol. Network activity under the CEMA Protocol thus consists of a series of packet transmissions separated by a series of contention slots, as shown in FIG. 10.

As seen in FIG. 10, a transmission 68 of a particular node is ended by an End of Transmission character (EOT) 70. Following the EOT is a series of time periods 72 and 74 of equal length when the network is not transmitting data. These time periods are called contention slots. As will be described later in greater detail, contention slots are those time periods during which each node can make a Reservation Request transmission to indicate that it wishes to transmit data.

Following the contention slots, a node which is scheduled to make the next data transmission (designated in a manner to be described below) begins its transmission 78 with a preamble 76 consisting of a sequence of readily recognizable bit patterns indicating that a transmission is about to begin. The node then transmits network control data in the form of an Arbitration Packet 80 which includes a start flag 82 and an end flag 84. Next, the node transmits a plurality of data packets 86 over the network, each packet being separated from the next by a flag. When the node has completed its data transmission, it sends an EOT character 88.

A predetermined number of contention slots then follow the EOT character. As can be seen in FIG. 10, a node has successfully transmitted a reservation in the first contention slot 90. During the second contention slot 92, two or more nodes have simultaneously transmitted a Reservation Request. This event, known as a "collision", results in a garbled transmission which is received by other nodes on the network as noise. In a third (and last) contention slot 94, another node has successfully completed a Reservation Request. After the last contention slot 94, the next scheduled node begins its transmission 96 with a preamble 98, followed by an Arbitration Packet 102 and plurality of application data packets 106. The transmission concludes with an EOT character.

An overview of a preferred embodiment of the method of the present invention is shown in FIG. 11. Standard operation of CEMA begins at block 109 with a predetermined node designated to be a control node, that is, to have control of the communications channel. As each node recognizes a need to transmit data over the channel as determined by its own internal data processing, it selects a contention slot, that is, a predetermined period of time following an EOT generated by another node, waits for the selected slot, and transmits a Reservation Request, as shown in block 110. When the Reservation Request is received by the node in control of the network, the ID of the node transmitting the successful Reservation Request is placed in a packet of network control data, referred to as an Arbitration packet, which is subsequently transmitted at block 111 to all nodes on the network. The successful Reservation Request is then placed in a data structure in all nodes to determine the order in which nodes will subsequently obtain control of the network. In the preferred embodiment, the data structure comprises a Pending Transmission Queue. Other types of data structures, such as an indexed table, may be used. The Arbitration Packet contains information identifying the next node scheduled to assume control of the network and other network control data. It is followed by a string of variable length application data packets to multiple nodes on the network as shown in block 112 and an EOT. The EOT signals the beginning of the next series of contention slots and the process is repeated, with the next scheduled node (as specified by the Arbitration Packet) assuming network control as the control node, as shown at block 113. The process is continued for each successive control node.

Figure 12:
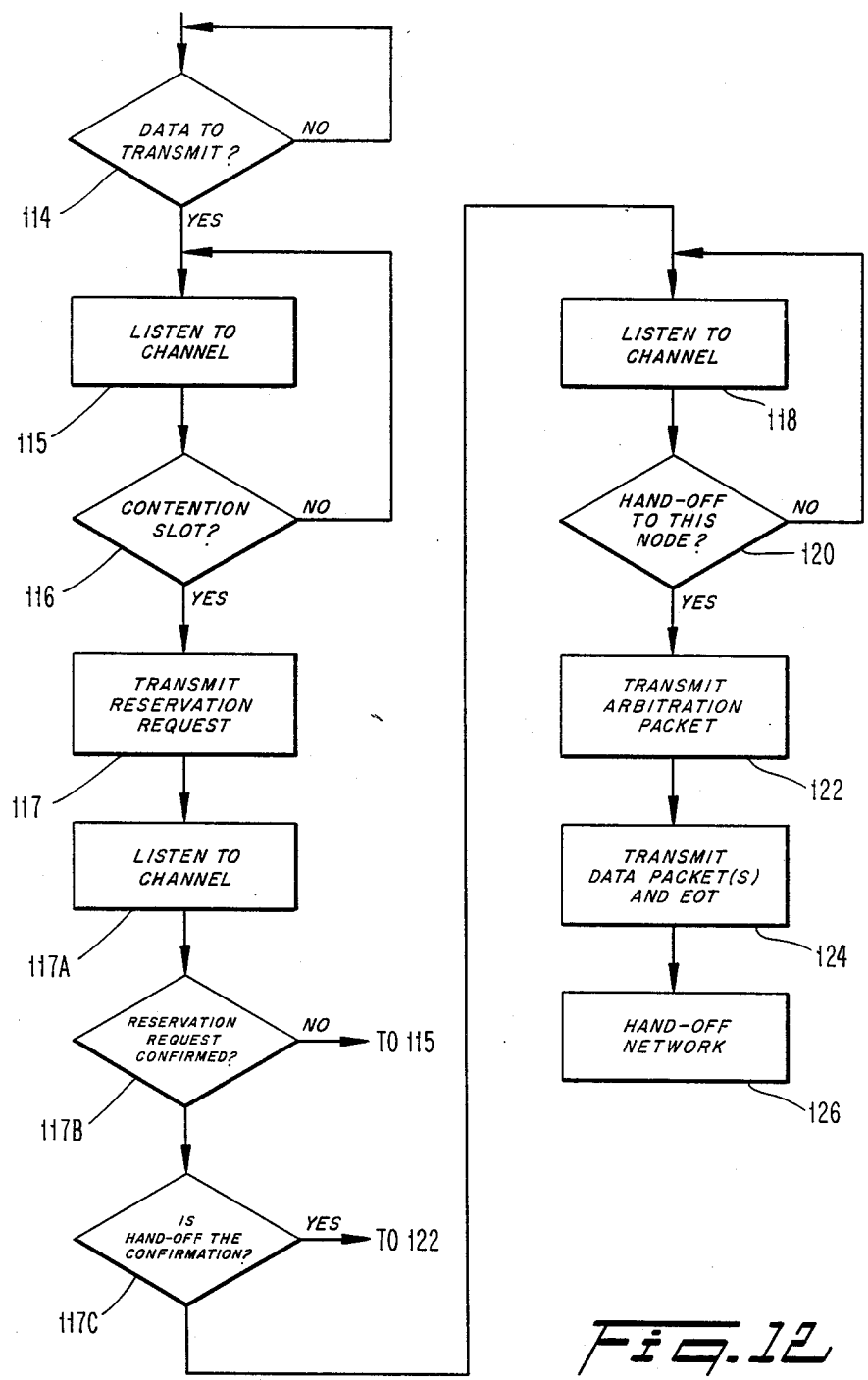
FIG. 12 is a logic flow chart showing network rotation in a preferred embodiment of the method of the present invention.

Operation of the network is implemented by each node as shown in greater detail in FIG. 12. As can be seen therein, the node first determines at step 114 if it has data to transmit. If so, it proceeds to step 115 wherein it listens to transmissions on the channel. By detecting an EOT character on the channel and monitoring the time following the transmission of such EOT character, the node selects one of several contention slots and determines at block 116 if a contention slot is occurring. If so, the node transmits a Reservation Request at block 117. The node listens to the channel at block 117A. If a reservation request is confirmed at block 117B, it is determined at block 117C if the confirmation is a hand-off, to be described below in greater detail. Otherwise, the node returns to monitor the channel at block 115. If the confirmation is not a hand-off, the node monitors the channel and loops at blocks 118 and 120 until this node is the node which will next assume network control. If not, the node continues to monitor the channel until such time as it is designated the control node. At such time, or if the confirmation at block 117C was a hand-off, the node transmits an Arbitration Packet at block 122 and transmits a variable number of application data packets, according to the amount of application data to be transmitted. Application data is data qenerated by application software in nodes of the network which is independent of operation of the network itself.

The node terminates its transmission with EOT character at block 124. It relinquishes control of the network at block 126.

Contention slots consist of a variable set of fixed time intervals during which the network is in quiescence. This gives network nodes the opportunity to transmit a short Reservation Request (FIG. 5) to indicate the need of the node to obtain control of the network to transmit data.

Figure 13:
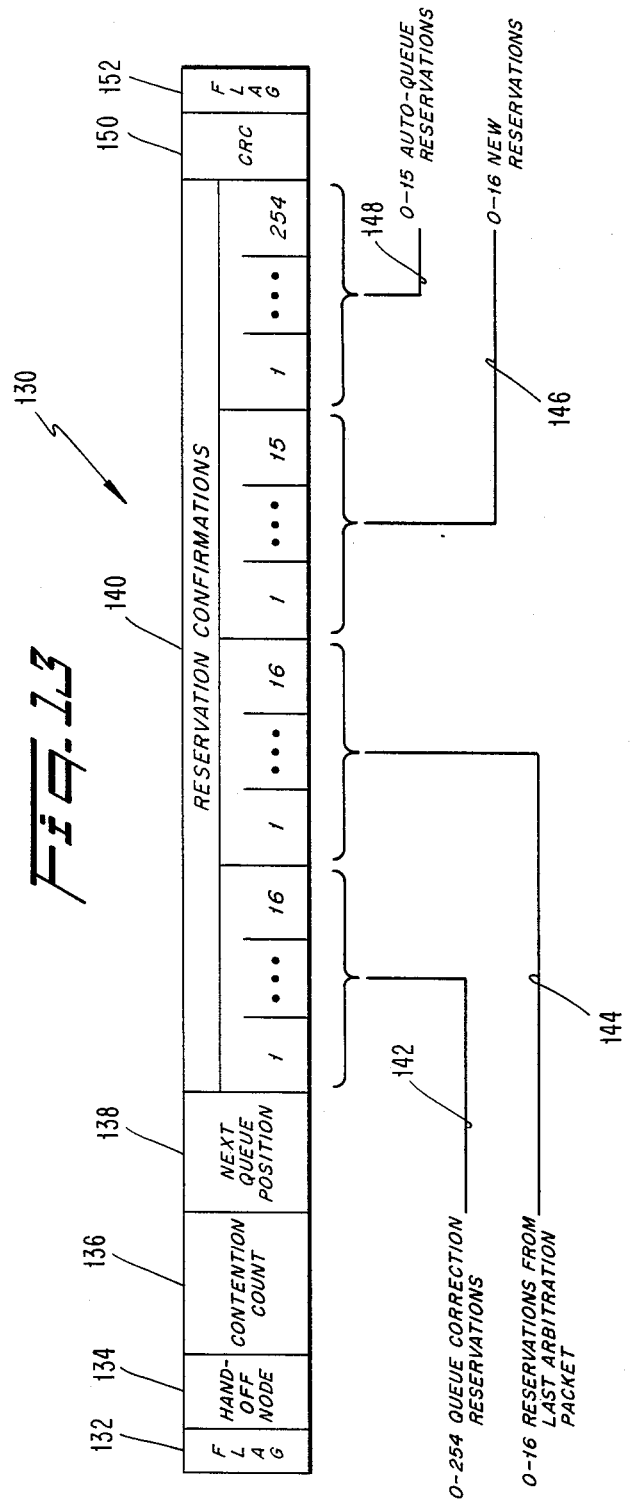
FIG. 13 is a diagram showing the structure of an Arbitration Packet shown in FIG. 10.

Packet transmissions consist of an Arbitration Packet, shown in FIG. 13, followed by one or more application data packets (FIG. 9). A multiple packet transmission is terminated with an EOT.

Arbitration Packets constitute network control data and serve to notify other nodes on the network of the pending transfer of network control from one node to another, of the future sequence of node transmissions, and of the number of contention slots. The transfer of control from one node to another is called network hand-off.

As seen in FIG. 13, an Arbitration Packet 130 includes a start flag 132 followed by a "hand-off node" field 134 which contains the ID of the node which is next scheduled to obtain control of the channel after completion of the transmission from the current transmitting node. The contents of the hand-off field thus represent the first entry of the Pending Transmission Queue of the transmitting node, the structure of which will be explained later in greater detail. Each node of the network includes an identical Pending Transmission Queue which, under normal circumstances, will contain identical entries consisting of a list of node IDs arranged in the order of which nodes associated with each ID will obtain control of the channel.

Following hand-off node field 134 is a "contention count" field 136 which specifies the number of contention slots which are to follow the EOT of the current transmission. The number of contention slots is dynamically allocated, in a manner to be described in greater detail, to maximize network efficiency according to the number of nodes which currently desire to obtain control of the network.

Following the contention count field 136 is a "next queue position" field 138. This field constitutes an index to the Pending Transmission Queues of all nodes and specifies the position in the Pending Transmission Queues where node identifiers will be stored. These stored identifiers are the identifiers of nodes from whom Reservation Requests have been successfully received by the node which generates the current transmission, this node being responsible for receiving Reservation Requests transmitted during the immediately preceeding contention slots by nodes desiring to obtain access to the network.

Following the next queue position field 138 is a block 140 containing reservation confirmations. These entries consist of the bottom portion of the Pending Transmission Queue of the transmitting node extending from the first ID requiring confirmation through the bottom of the queue. The node ID's in block 140 will thus be stored by each node in its Pending Transmission Queue beginning at the location specified by the contents of next queue position field 138.

The first entries 142 in block 140 include possible queue correction reservation confirmations. Such queue correction reservations begin with the ID of a node which the currently transmitting node recognizes as having a damaged Pending Transmission Queue. This recognition is based on the reception (during the preceding contention slots) by the currently transmitting node of a Reservation Request from a node which already has its ID stored in the Pending Transmission Queue. Since a node will not transmit a Reservation Request if it is aware that its ID already is in the Pending Transmission Queue (as was discussed with respect to FIG. 12), transmission of a Reservation Request bY a node whose ID is already in the Pending Transmission Queue is an indication that the node transmitting the Reservation Request has a damaged Pending Transmission Queue. If it is determined that there is a node with a damaged queue, the contents of field 142 thus consist of at least one node identifier for the Pending Transmissions Queue of the node transmitting the Arbitration Packet to permit correction of Pending Transmission Queue entries by a node having a damaged Pending Transmission Queue, to permit the nodes to rebuild their Pending Transmission Queues, and to reestablish identical Pending Transmission Queues in all nodes.

Field 144 consist of the node IDs which were transmitted by the immediately preceedinq Arbitration Packet as new reservation confirmations. In a manner to be described later in qreater detail, the contents of field 144 permit a node which did not successfully receive the preceeding Arbitration Packet to "repair" its Pending Transmission Queue so that such Pending Transmission Queue is identical to that maintained in all other nodes.

The contents of field 146 represent the reservation confirmations which have been recognized by the currently transmitting node as a result of Reservation Requests transmitted by other nodes during the immediately preceeding contention slots.

Finally, block 140 contains a field 148 consisting of auto queue reservations. The contents of field 148 thus consist of node ID's which are generated by the currently transmitting node to indicate "target" nodes from which the currently transmitting node expects to receive data. In a manner to be described later in greater detail, the auto queue feature eliminates the need for such target node to generate Reservation Request during succeeding contention slots.

An error correction field 150 consist of a Cyclic Redundancy Check (CRC) value generated as an error correction code, in a manner well known in the art. Arbitration packet 130 concludes with a stop flag 152.

Data packets carrY application-specific data. Although a data packet must conform to the standard packet format shown in FIG. 3, the data portion of the packet is variable in length, application specific, and protocol independent.

CONTENTION MANAGEMENT

As shown in FIG. 10, the beginning of a series of contention slots 72, 74 is signaled by EOT 70 which terminates a multiple packet transmission 68. When a node has data to transmit, it requests transmission time by randomly selecting one contention slot out of a group of two or more that are available as specified by the contention count transmitted in the prior Arbitration Packet (FIG. 13).

Figure 14:
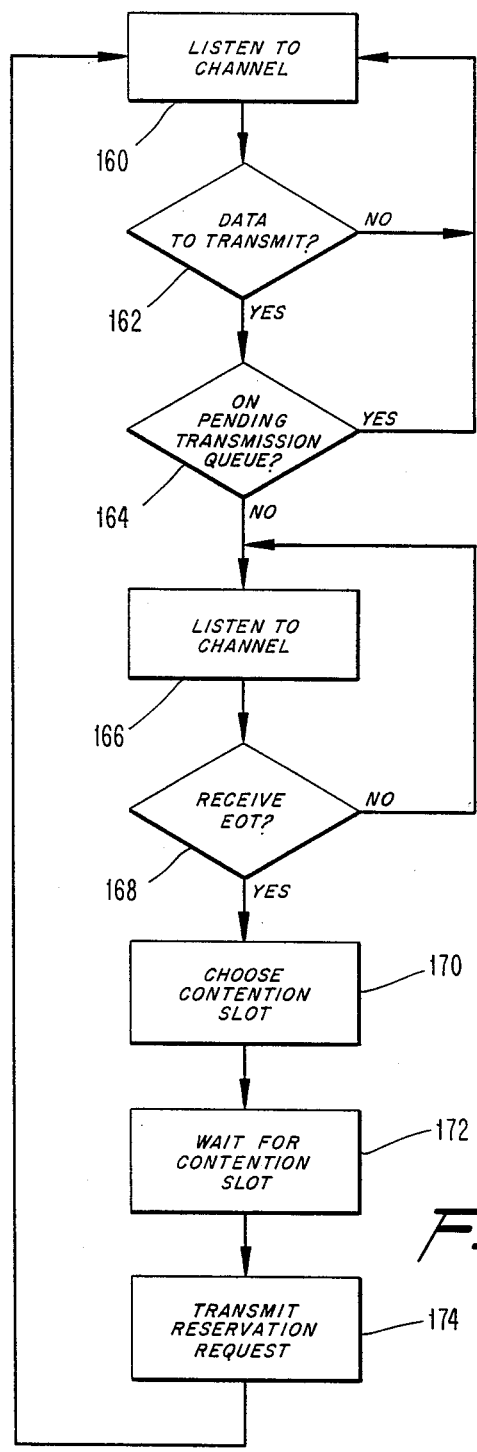
FIG. 14 is a logic flow diagram showing the activity of a contending node in a preferred embodiment of the method of the present invention.

The operation of a node embodying the present invention in contending for access to the communications channel of network 10 is shown in FIG. 14, wherein the node transmits a Reservation Request by listening to the channel at block 160 and determining at block 162 if the node has data to transmit. If not, the node continues to listen to the channel. If so, the node examines its Pending Transmission Queue to determine if its own ID currently is entered in the Pending Transmission Queue. If so, there is no need to transmit a Reservation Request and the node returns to block 160 to monitor the channel.

If the ID for this node is not present on its Pending Transmission Queue (which is identical in all nodes), it listens to the channel at block 166 and determines at block 168 if an EOT character has been received. The node continues to monitor the channel at such time as an EOT character is received. It then randomly selects a contention slot (each consisting of an identical length time period) and waits at block 172 for a calculated period of time following receipt of the EOT transmission depending on the specific contention slot chosen. Upon occurrence of the chosen contention slot, the node transmits a Reservation Request which, as shown in FIG. 5, consists of a link ID number and an error control block.

During each contention slot, two or more nodes may be transmitting identifying information at the same time, a condition referred to as a "collision." If a collision occurs during a contention slot, a garbled RF signal is received by other nodes on network 10 as noise, as shown at 92 is FIG. 10. If no collision occurs during a contention slot, the transmission of the Reservation Request is received by all nodes on the network.

The node which is scheduled to assume network control at the end of the series of contention slots (as specified by the hand-off node field 134 of the previous Arbitration Packet) is responsible to listen to the network during the contention slots and receive as many of the Reservation Requests as it can.

FIG. 15 is a logic flow diagram describing how a hand-off node monitors contention slots. At block 180, the node receives hand-off by recognizing the presence of its own ID in the hand-off node field 132 of the preceeding Arbitration Packet 130. At block 182, the hand-off node monitors the channel until such time as an EOT transmission is received at block 184. The node continues to monitor the channel at block 186 listening for Reservation Requests transmitted by nodes desiring to obtain access to the communications channel and transmit data over the network. If no Reservation Requests are received during the first contention slot, as determined at block 188, the node next determines at block 190 if this contention slot is the last contention slot, as specified by the value contained in the contention count field 136 of the preceeding Arbitration Packet 130. If not, the node returns to block 186 and continues to monitor the channel.

If a Reservation Request is successfully received at block 188, the ID of the node transmitting such Reservation Request is placed at block 192 in the Pending Transmission Queue of this node. The node increments a Reservation Request count at block 194 and determines at block 196 if the current contention slot is the last contention slot. If not, the node repeats the process beginning at block 186.

Upon expiration of the last contention slot, the node determines at block 198 if the Reservation Request count is equal to zero, that is, if no Reservation Request was successfully received during the preceeding contentions slots. If the count is zero, this is an indication that too many collisions are occurring and the network should increase the number of contention slots to decrease the probability of collisions occurring during transmitted Reservation Request. The node thus increments the contention count at block 200. If the Reservation Request count is not zero, the node determines at block 202 if the Reservation Request count equals the contention count, that is, whether the number of successfully received Reservation Requests is equal to the number of contention slots. If so, this is an indication that no collisions occurred during the preceeding contention slots. Such condition does not produce maximum network efficiency, since excessive network time is being devoted to listening for Reservation Requests. The maximum efficiency occurs when a small but finite number of collisions occur during contention slots. Therefore, the node acts to increase network efficiency by decrementing the contention count at block 204.

At block 206, a determination is made if any of the Reservation Requests are already present in the Pending Transmission Queue. If so, this is an indication that the node transmitting such a Reservation Request has a damaged Pending Transmission Queue and the controlling node loads queue correction reservations into field 148 of the Arbitration Packet being prepared at block 208. At block 210, the node loads the reservation confirmations from the block 142 of the previous Arbitration Packet into block 144 of the Arbitration Packet being readied for transmission. At block 212, the node IDS present in the Reservation Request successfully received by this node in the immediately preceeding contention slots are loaded into block 142 of the Arbitration Packet being prepared for transmission. At block 213, the ID of a node from which this node is expecting data will be loaded into the arbitration packet, as an auto-queue reservation.

At block 214, a determination is made if the Pending Transmission Queue has a valid node ID in the first position of its active window. If not, this is an indication of a "hole" in the queue and a determination is made at block 216 of whether the queue is empty. If the queue is not empty, the node at block 218 places a zero in the hand-off field 134 of the Arbitration Packet being prepared for transmission. This is an indication of an error in the Pending Transmission Queue of this node. Thus, this node will not designate the node which is to next assume control of the network, but will signal all other nodes that they are to search their own Pending Transmission Queues to determine if their own ID is present at the top of the queue. In this manner, the proper node will next assume control of the network.

If it is determined at block 216 that the queue is empty, this is an indication that no node currently desires to transmit data. The network will thus enter a "ping-pong" configuration in which this node, at block 220, places in the hand-off field of the Arbitration Packet being prepared the ID of the node which generated the preceeding transmission.

If it is determined at block 214 that there is a valid node in the Pending Transmission Queue, this node, at block 222, places in the hand-off field of the Arbitration Packet being generated the node ID which is at the top of this nodes Pending Transmission Queue.

At block 224, the node transmits the Arbitration Packet assembled in the preceeding blocks and then precedes at block 226 to transmit its application data to other nodes through a plurality of data packets. At the end of the last data packet, the node transmits an EOT character and then assumes a monitoring mode at block 228.

Operating under CEMA protocol, the only period of network activity in which collisions may occur is during contention slots. Since each contention slot is approximately 4% of the time used to transmit a data packet of 256 bytes, the total network time during which a collision is possible is less than 10% of network availabilitY. At no other time can collisions occur.

The probability of contending successfully for network transmission time is based on the number of nodes contending on the network applied to the Poisson Distribution of Statistical Analysis. The application of this algorithm leads to the projection of 85% network utilization.

NETWORK USE RESERVATION

As previously described, the transmitting node which has control of the network places in the Arbitration Packet (FIG. 13) the IDs of all nodes which were properly received in Reservation Requests during the previous contention slots. When the Arbitration Packet is transmitted, these confirmations of reservations within the Arbitration Packet are received by all nodes on the network. All nodes on the network then place these IDs in their respective Pending Transmissions Queue, an example of which is given in FIG. 16.

By this mechanism, a node having data to transmit is required to transmit Reservation Requests only when its identifier is not already on the Pending Transmission Queue, thus reducing the amount of time that the channel is occupied with network control duties rather than transmitting application data. When a node has a confirmed transmission reservation i.e., its ID is in the Pending Transmission Queue, it no longer has to transmit Reservation Requests even if it acquires more data to transmit after being placed on the queue.

Once a node is on the Pending Transmission Queue, it needs only to wait until its turn to take control of the network. At that time it transmits multiple data packets to multiple nodes. In the preferred embodiment, the maximum number of consecutive data packets is fifteen. However, this limitation is arbitrarY, and may be altered according to the requirements of the specific network and circuit.

By limiting the number of times a node must transmit Reservation Requests in order to transmit a set of data packets, the number of contention slots which are necessary to keep the network active can generally be reduced to two slots per transmission sequence.

In a heavily loaded network, the number of nodes requesting transmission is equal to the number of nodes that actually gain access to the network for transmission. This one to one relationship in a heavily loaded network is all that is required for the network to stay in balance.

DYNAMIC ALLOCATION OF CONTENTION SLOTS

The number of collisions during contention slots is directlY related to the number of nodes contending for transmission. More collisions during contention slots result in fewer Reservation Requests being successfully received by the controlling node. As has been described with respect to FIG. 15, the number of contention slots is therefore dynamically allocated based on network load.

If a controlling node sees no successful transmissions during the contention slots (that is, the number of successful contentions is equal to zero), it specifies by the contention count in its Arbitration Packet that the following series of contention slots is increased by one. Thus, given a heavily active network with such contention that multiple collisions occur during the available number of contention slots, the next contention slot group is increased by one. Although in the preferred embodiment the number of contention slots is increased to a maximum of sixteen to assure the probability that at least one Reservation Request is confirmed, the number need not be limited to any maximum.

When a contention slot group contains several contention slots and the controlling node successfully receives a Reservation Request in each of the slots provided, the controlling node recognizes that the number of contention slots is greater than the network needs and reduces the contention count in the contention count field of the Arbitration Packet by one to a minimum of two.

If one or more slots receives a valid Reservation Request while one or more slots remains emptY, the network assumes that the number of slots is sufficient for network demand and the contention count remains unchanged from the previous Arbitration Packet.

The following rules thus apply to the dynamic allocation of contention slots:

If the number of Reservation Request received during a series of contention slots is less than the contention count specified in the prior Arbitration Packet, but is greater than zero, the contention count remains unchanged.

If the number of Reservation Requests received during a series of contention slots is equal to the contention count in the prior Arbitration Packet, the contention count is reduced by one to a minimum of two.

If no Reservation Requests are received during a series of contention slots, the contention count is increased by 1 to a maximum of sixteen.

This technique optimizes the number of contention slots required to keep the network in balance at all times under varying loads. Under heavy network load, the average number of contention slots per transmission is between 2 and 2½ or about 10% of the total network time. This percentage increases to a maximum of approximately 25% of network time as network demand falls.

QUEUE WINDOW MANAGEMENT

The Pending Transmission Queue is a list of node IDs arranged in the order in which reservations were confirmed. It is present in all nodes, in identical form, to control the order in which nodes will assume control of the network. It consists of a rotating table of 255 entries of which only a portion are current at any given time. These active entries are bracketed in a migrating window which shifts position as each successive node assumes control of the network (effectively shrinking by one position the size of the window), and expands as each successive Arbitration Packet identifies new nodes to be placed on the queue as a result of successfully received Reservation Requests.

FIG. 16 shows an example of a Pending Transmission Queue on any node of a network, much larger than network 10, having active nodes A-G, prior to transmission from node B. The active window brackets nodes B though E in entries 2 though 5. An Arbitration Packet 250, shown in FIG. 17, is then transmitted by node B as it assumes control of the network.

After Arbitration Packet 250 is received by all nodes, the active window of the Pending Transmission Queue is shifted to exclude node B (which is no longer on queue since it just transmitted) and is expanded to include nodes F and G from which Reservation Requests were successfully received during the preceding contention slots, and node H which is placed on the queue by virtue of an auto-queueing technique to be described later. The active window now includes nodes C, D, E, F, G, and H in entries 3 through 8 as shown in FIG. 18.

Each Arbitration Packet specifies in the next queue position field 138 the position number of the next open position on the Pending Transmission Queue. The ID's of the successfully received Reservation Requests are then placed in the Pending Transmission Queue beginning at this position number. When they are a consequently transmitted in an Arbitration Packet, they become "reservation confirmations." The next queue position field 138 in the Arbitration Packet (FIG. 17) indicates that the new series of Reservation Confirmations should be placed in the pending Transmission Queue starting with entry number 4. By this means, a particular confirmation is always placed in the same position on all queues by all nodes.

Unlike the usual operation of a queue, this window technique applied to the transmission queue manages the event of a missing entry. If a node did not receive an Arbitration packet because of a transmission error, it creates a "hole" in its Pending Transmission Queue and places the next set of reservation confirmations it receives into the prescribed position beginning with the position indicated by "next queue position" field 138 of the Arbitration Packet. As shown in FIG. 17, the ID of the next sequential node on the Pending Transmission Queue is stored in position 4 on the Pending Transmission Queue.

FIG. 19 illustrates the contents of a Pending Transmission Queue if the Arbitration Packet from node A and the previous Arbitration Packet had not been properly received. A "hole" thus occurs within the active window.

With all nodes notified where a series of reservation confirmation IDs must be placed on the pending Transmission Queue, the Pending Transmission Queues become synchronized across all nodes. Consequently, transmissions are specified in order, handoff to hand-off, and there is thus never a node ID out of order.

The controlling node transmits within the Arbitration Packet, not only new confirmations, but re-confirmations of confirmations transmitted for the first time in the prior Arbitration Packet. Thus, every confirmation is transmitted in two successive Arbitration Packets. Every node then, has two opportunities to gain confirmation information to create or correct its queue. As a result, only 1 out of 1,000,000 confirmations are received improperly when the bit error rate is $1 \times 10^5$.

AUTO-QUEUEING

When a controlling node recognizes that it should receive a response to a data packet from a "target" node at the other end of the data circuit, and that target node does not already have a confirmation reservation on the Pending Transmission Queue, the controlling node places the ID of the target node from which it expects a response into the Arbitration Packet (FIG. 5) as an auto-queued Reservation Confirmation. This could occur for more than one target node in one transmission.

This assures a confirmation reservation for the target node in its turn while eliminating the need for the target node to transmit a Reservation Request during contention slots. This reduces the network demand during contention slots thereby reducing the possibility of collision on the network. Network performance is consequently improved by allowing the allocation of fewer contention slots.

Since a node with multiple communication relationships (or circuits) can make a transmission to multiple nodes within its transmission time frame by sending multiple data packets, a node need appear in the active window of the Pending Transmission Queue only once. This also reduces the network demand during contention slots thereby reducing the possibility of collision on the network. Since all nodes keep a copy of the Pending Transmission Queue (see FIGS. 16, 18 and 19), the originating node can determine exactly when to expect a response from a target node by interrogating its Pending Transmission Queue.

Using this schema during a period of heavy network activity, a node contends for a transmission reservation and when it wins a place on the Pending Transmission Queue and receives network control, it automatically places into the auto-queue field of the Arbitration Packet a confirmation for the target nodes which will receive and reply to any data packets to be transmitted, if that target node is not currently on the Pending Transmission Queue. Upon transmission of the Arbitration Packet, this confirmation is placed in the Pending Transmission Queue of all network nodes.

When the target auto-queued node assumes control of the network, it does so without contending for the network during contention slots, and in its turn auto-queues the originating node. Thus, the queue becomes a dynamic, rotating table.

For any rapid exchange of data consisting of multiple transmissions between two nodes, there is only one initial contention on the network. This reduces the load on the network by reducing the possibility of delay caused by collision during contention slots, and increases response time. These efficiencies are shared by all active nodes on the network. Inactive nodes which do not contend do not impact network throughput.

In addition, this mechanism allows the queue to replace the time-out mechanism which exists on most networks. Rather than timing-out after an arbitrary time period without receiving a response, the transmitting node can determine when it should expect a response by interrogating its Pending Transmission Queue. In the event that a transmission is not received per the queue, a mechanism has been provided for the continued management of the network as described below.

Since heavier network activity will result in more reservation confirmations by the auto-queue procedure, fewer contention slots will be necessary. A smaller percentage of total network time is thus taken up by network control data and a greater percentage by application data. Contrary to the prior art, network efficiency thus improves with increased network activity.

NETWORK HAND-OFF

When a controlling node has an established pending Transmission Queue, it takes from the queue the identifier of the node next sequentiallY listed in the active window and places that identifier in the hand-off field 134 of the Arbitration Packet as previously described with regard to FIG. 17.

If the controlling node has a "hole" in its queue (i.e. it cannot specify which node is scheduled to transmit next), it places a zero is the hand-off field 134 of the Arbitration Packet (FIG. 13). This alerts all network nodes to interrogate their respective Pending Transmission Queues, find the ID and to assume control of the network should they recognize that it is their turn to do so. Thus, an explicit hand-off to a predefined node selected from the Pending Transmission Queue is replaced, for the next transmission only, by an implicit transmission hand-off.

Hand-off field 134 specifies the node which is the next to take explicit control of the network upon receipt of an EOT. While in control of the network, a node monitors the next set of contention slots and transmits the next Arbitration Packet (see FIG. 13), any Data Packets, and an EOT.

As insurance against network failure, the node which is transferring network control retains implicit control of the network until it receives a valid Arbitration Packet from the hand-off node which was specified in field 134 of the Arbitration Packet which that node just transmitted. Network hand-off is not considered complete until a valid packet is recognized by the transferring node.

Figure 20:
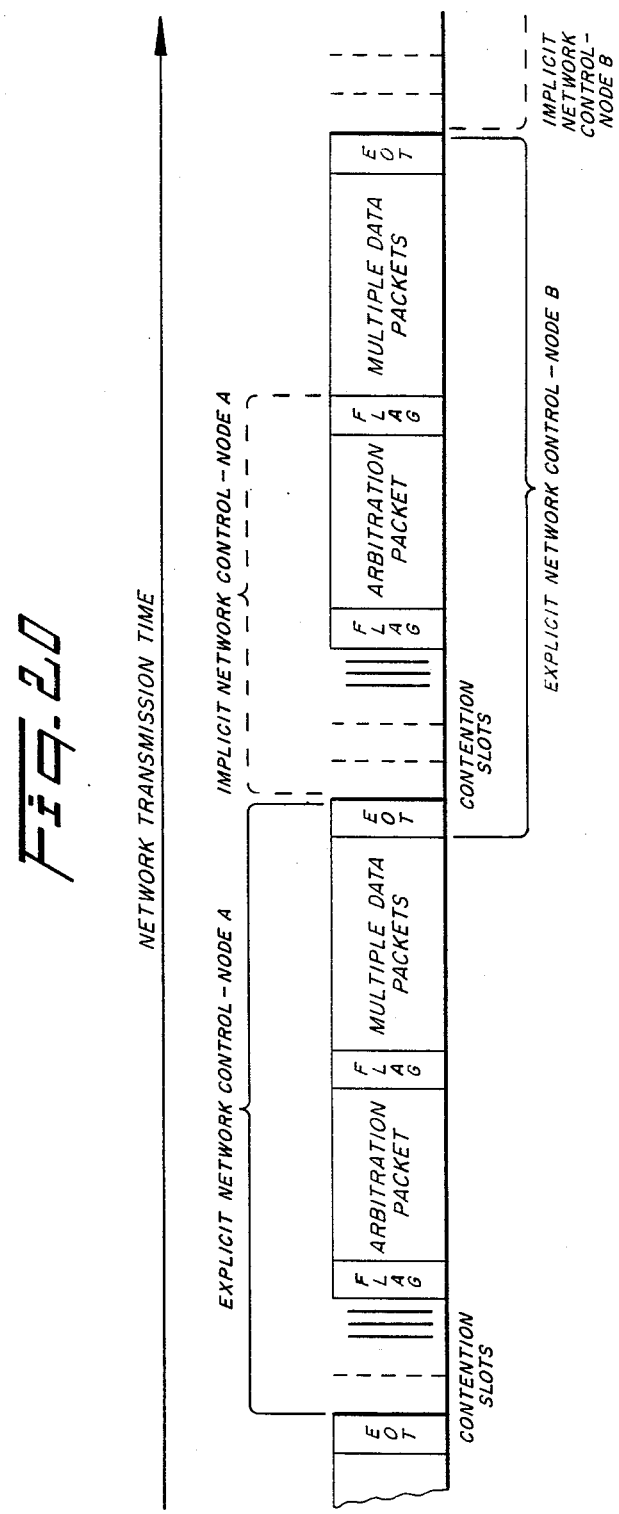
FIG. 20 is a timing diagram illustrating node responsibility during network activity rotation.

As shown in FIG. 20, during each set of contention slots, two nodes are always in control of the network. The transferring node maintains an implicit control of the network while the hand-off node assumes explicit control.

Alternately, if the controlling node specifies in the Arbitration Packet a hand-off to a node which has subsequently gone off-network, only noise appears on the network after the contention slots. The controlling node waits a period of time sufficient for the transmission of an Arbitration Packet plus a maximum length data packet, and then makes up to two additional attempts to hand-off the network to the non-responsive node. If the specified node fails to take the hand-off, the controlling node selects the next node on the Pending Transmission Queue and repeats the process. Should the controlling node fail to detect network hand-off after appealing to two nodes, it assumes that a hardware error has occurred and places the network in a Network Idling Mode as described below.

Figure 21:
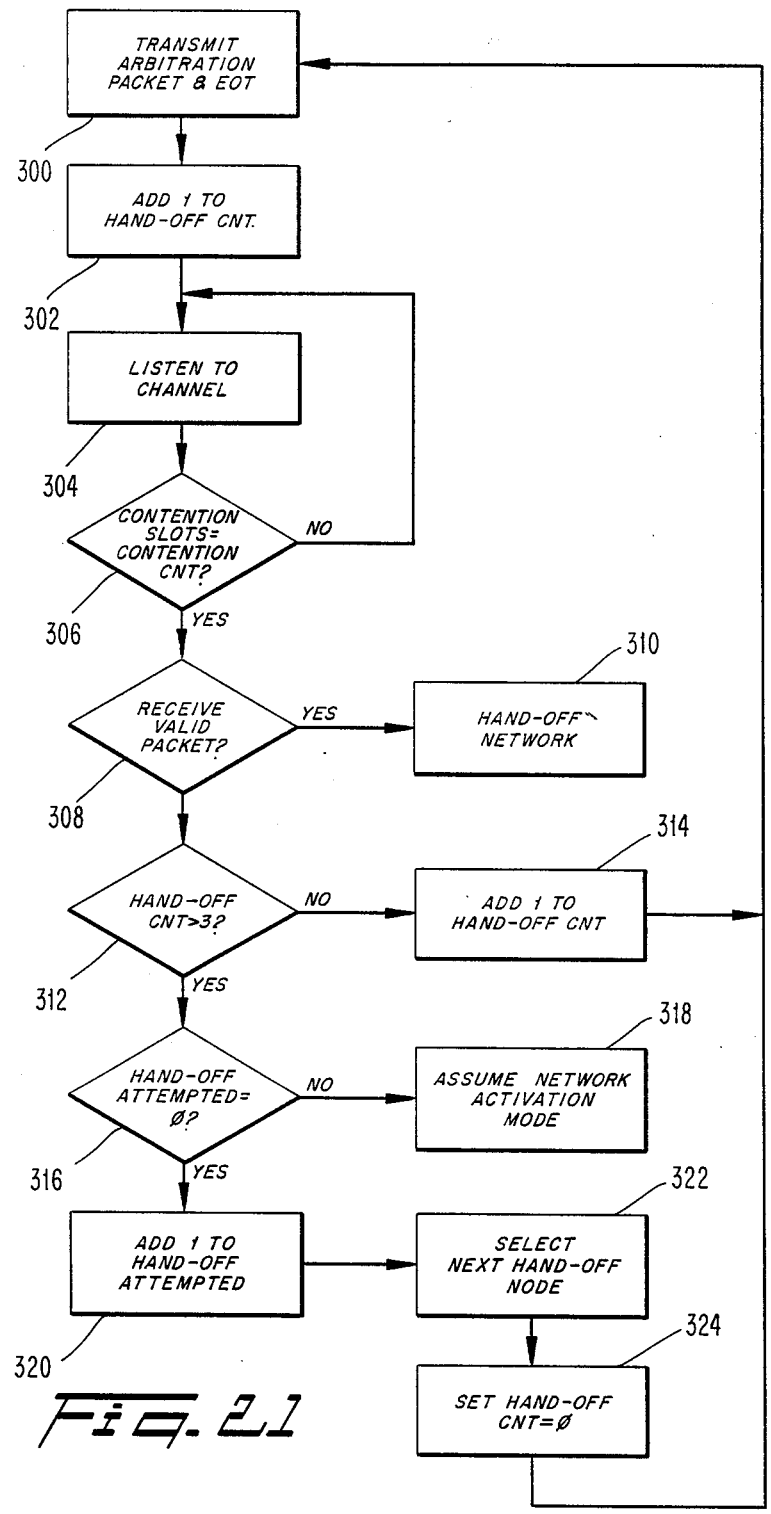
FIG. 21 is a logic flow diagram showing the activity of a controlling node in a preferred embodiment of the method of the present invention.

A detailed logic flow diagram of the operation of a controlling node proceeding to hand-off network control to the next node, as specified in an Arbitration Packet transmitted by the controlling node, is shown in FIG. 21, for a preferred embodiment of the invention. As can be seen at block 300, the controlling node transmits its Arbitration Packet, Data Packets, and EOT. A hand-off counter is incremented at block 302 and the node proceeds to blocks 304 and 306 to monitor the channel during the contention count. At block 308, a determination is made if a valid packet has been received after the end of the contention slots. If so, the node designated to next receive network control has indeed accepted network control and proceeded to transmit its own Arbitration Packet. The hand-off is thus considered complete at block 310.

If no hand-off Arbitration Packet has been received, a determination is made at block 312 if the hand-off counter is greater than 3. If not, the hand-off counter is incremented at block 314 and the node returns to block 300 to retransmit its Arbitration Packet. If the hand-off counter is greater than 3, a determination is made at block 316 if the "hand-off attempted" counter is equal to 0. If not, network activation mode at block 322. Otherwise, the node attempts to hand off to another node at blocks 320-324.

ERROR CHECKING AND CORRECTION

All packets listed in FIG. 4 are equipped with an error-control field (see FIG. 3) in which is placed the result of a Cyclic Redundancy Check (CRC) calculation on that packet. CRC is a standard packet switch mechanism by which a calculation is performed on all the data bits in a packet to produce, prior to transmission, a result which can be matched to the result of the same calculation performed when the packet is received. Calculations used to generate a CRC are varied and are application-specific. They are thus outside the scope of CEMA. In the preferred embodiment, a CRC is present for CEMA to function optimally.

If the error-control field of a received packet matches the result of the CRC calculation contained within the packet, all data transmitted within the packet can be assumed to be received as sent.

If the CRC calculation performed by the receiving node of a packet does not match the error-control field in the packet, the packet is assumed to be damaged, and is discarded. Retransmission of damaged packets is then requested. This error checking technique is especially pertinent to the transmission of Arbitration Packets.

By definition, hand-off is not considered complete until a valid packet has been successfully received. Thus, when a subsequent Arbitration Packet is transmitted by a hand-off node, it can be assumed that the hand-off node was properly received from the previous Arbitration Packet and that all confirmations in the packet are correct.

QUEUE MAINTENANCE AND AUTO-CORRECTION

On a noisy network, it is possible that some nodes will correctly receive an Arbitration Packet while other nodes will receive a damaged packet. The receipt of a damaged Arbitration Packet leaves "holes" in the Pending Transmission Queue of the receiving node.

If a contending node does not successfully receive an Arbitration Packet which contains a reservation confirmation for that node after having transmitted a Reservation Request, the contending node is unable to update its Pending Transmission Queue and validate the confirmation. This causes the node to continue transmitting Reservation Requests during contention slots even though its ID has been placed in the Pending Transmission Queues of all nodes which correctly received the Arbitration Packet.

Since every Arbitration Packet contains not only new confirmations, but re-confirmations of those confirmations transmitted from the previous Arbitration Packet (FIG. 13), the contending node has two opportunities to correct its Pending Transmission queue.

If the contending node fails to receive one Arbitration Packet, it can correct its Pending Transmission Queue by placing re-confirmations from the next successive Arbitration Packet into its queue. Should a contending node fail to successfully receive two successive Arbitration Packets it continues to contend during contention slots.

The controlling node recognizes the contending node has a damaged queue by comparing its Pending Transmission Queue with reservations made during contention slots. If the ID of a new successful Reservation Request matches an ID on the Pending Transmission Queue, the controlling node places into the Arbitration Packet the bottom portion of its Pending Transmission Queue beginning with the slot containing the ID of the improperly contending node and extending to the end of the queue.

If a controlling node attempts to hand-off control to a contending node prior to the correction of the damaged Pending Transmission Queue, the contending node recognizes the hand-off by interrogating the hand-off field in the packet and then properly assumes control of the network.

NETWORK IDLING

Figure 22:
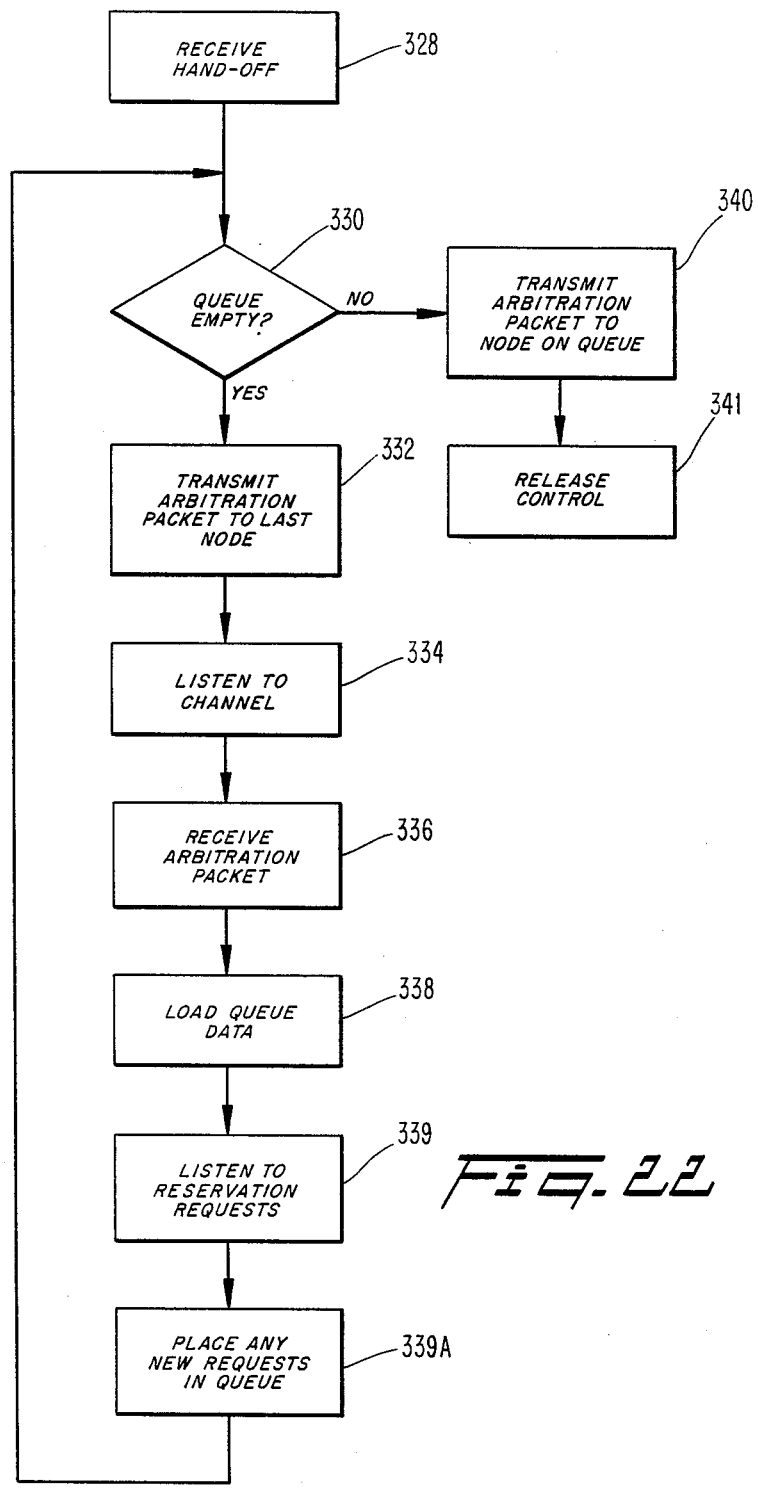
FIG. 22 is a logic flow diagram showing the activity of an idling network in a preferred embodiment of the method of the present invention.

In the case that the Pending Transmission Queue on every node should become empty because no nodes are requesting transmission, the controlling node idles the network as shown in FIG. 22 while retaining the availability of the network via contention slots.

After receiving a hand-off in block 328 and recognizing an empty queue in block 330, a node hands-off control of the network at block 332 by transmitting an Arbitration Packet to the node which sent the last Arbitration Packet. The node listens to the channel at block 334, and since the destination node also has an empty queue, the destination node consequently hands-off control back to this node, by the same logic, thus transmitting an Arbitration Packet which is received by this node at block 336. Queue data is loaded at block 338. This "ping-pongs" control of the network between two nodes, looping through blocks 339, 339A and 330 until a third node transmits a Reservation Request during contention slots and is given control of the network.

If the queue was not empty as block 330, a normal Arbitration Packet is transmitted at block 340 and control relinquished at block 341.

NETWORK ACTIVATION

Figure 23:
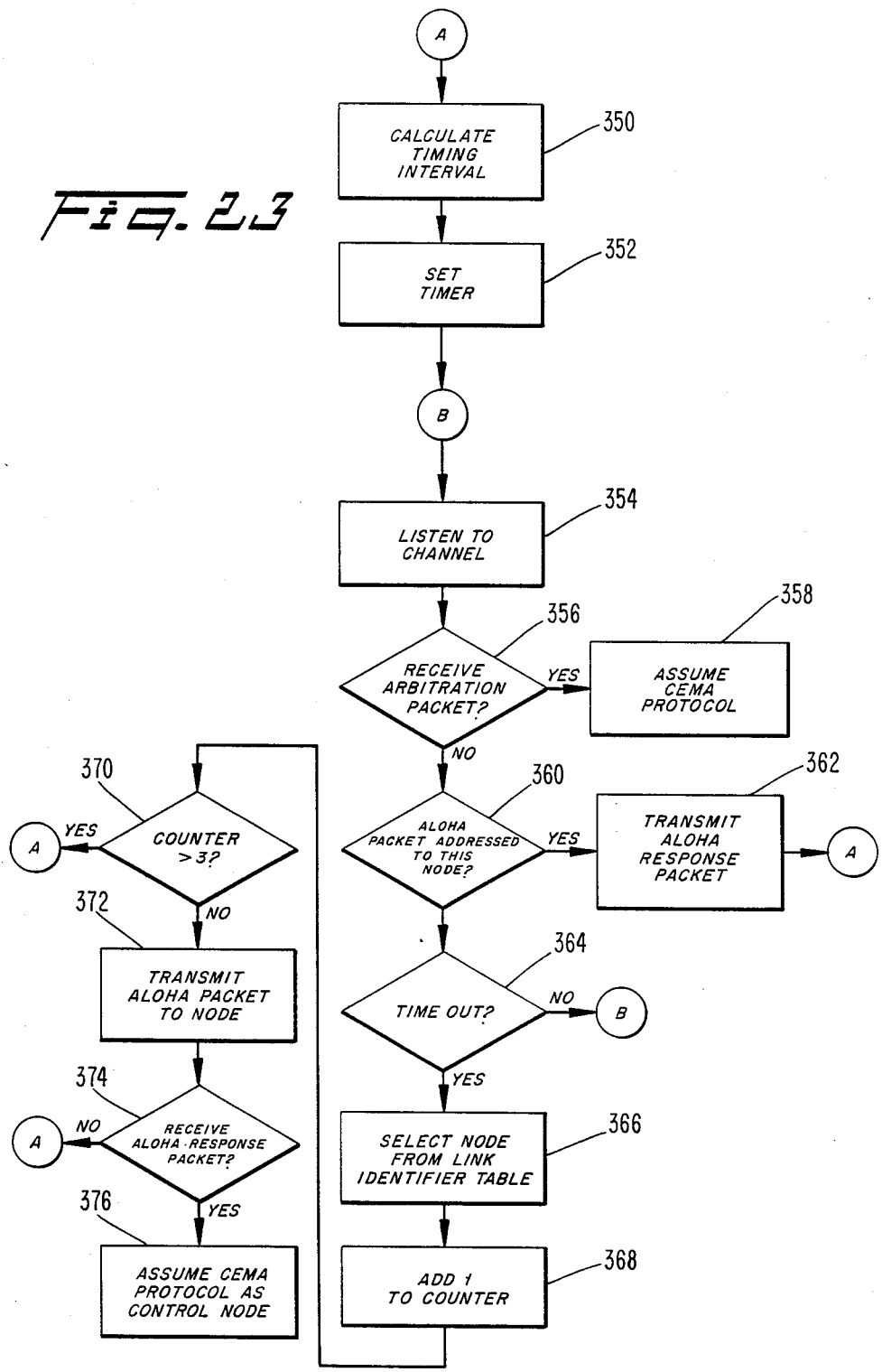
FIG. 23 is a logic flow diagram showing network initiation activity in a preferred embodiment of the method of the present invention.

FIG. 23 describes the steps necessary to activate the network of a preferred embodiment in which no activity has occurred since network power-up. This situation would occur when the network has been established for the first time, when the network has gone down due to a total network failure, or when the network must be restarted for some technical reason.

When power is restored, all nodes calculate a random time at block 350 based on an algorithm which uses a randomly derived variable. A timer is set at block 352. All nodes listen to the channel at block 354 for an Arbitration Packet. If an Arbitration Packet is received at block 356, normal CEMA operation is initiated at block 358. If an Aloha Packet is received addressed to this node, as determined at block 360, an Aloha Response packet is transmitted at block 362, and a new timing interval calculated at block 350.

If time-out occurs, the node selects a node at block 366 from its link identifier table (to be described below in greater detail), increments a counter at block 368, and checks the counter at block 370. If the counter is greater than 3, this is an indication either that all selected nodes are off network or that this node is faulty and should discontinue all transmissions until a valid packet is received. A new timing interval is again calculated at block 350. If the counter is less than three, an Aloha packet is transmitted to the node at block 372. If an Aloha Response is received from the node at block 374, normal CEMA operations are begun at block 376 with this node as control node. Otherwise, the node loops back to block 350. The timing interval for these transmission is approximately 45 seconds plus a random time factor and is used only during Network Activation transmissions.

Because of the random nature of Aloha transmissions by the network nodes, one of the transmissions can be expected to be received by another node on the network in a timely fashion with a minimum possibility of collision.

The Aloha Packet is addressed to a node listed on the link identifier (ID) table of the transmitting node. The link ID table, illustrated in FIG. 24 and relating to a network configuration to be described in relation to FIG. 25, consists of a list of all transmission relationships (circuits) assigned to that node. The link ID portion of the link ID table is permanently stored in the memory of the node.

When a destination node properly receives an Aloha Packet, it transmits an Aloha Response packet (FIG. 7) back to the originating node using a Stop and Wait protocol. As soon as the originating node receives the Aloha Response packet, it assumes control of the network and transmits an Arbitration Packet with hand-off to the responding node, terminating with an EOT. Since all other monitoring nodes receive the EOT, network acting proceeds with all nodes using normal CEMA protocol.

If a node is unsuccessful in receiving an Aloha Response packet within three transmissions to a destination node, the node shifts to an off-network state and does not attempt to gain access to the network until it successfully receives an Arbitration Packet during normal CEMA activity. This guarantees that a failed node does not interfere with the network.

When a large number of nodes are participating in Network Activation, network start-up or recovery occurs within 90 seconds.

CIRCUIT INITIATION

The invention may, of course, be used in a wide variety of network configurations. In each configuration, however, once a network is activated during Network Activation, Network Circuits between nodes must be established. As previously discussed with regard to FIG. 1, a preferred embodiment of the invention is implemented in a network including a plurality of nodes, each including one or more terminals. Each terminal establishes a link with one other terminal associated with another node. Network activation in the preferred embodiment thus consists of a procedure in which the various nodes recognize the activation of terminals associated with links passing through the nodes. It is to be understood that the invention is not limited to this configuration but may be employed in other network configurations such as, for example, multiple addressing configurations in which each terminal of a node may communicate with more than one other terminal.

Figure 25:
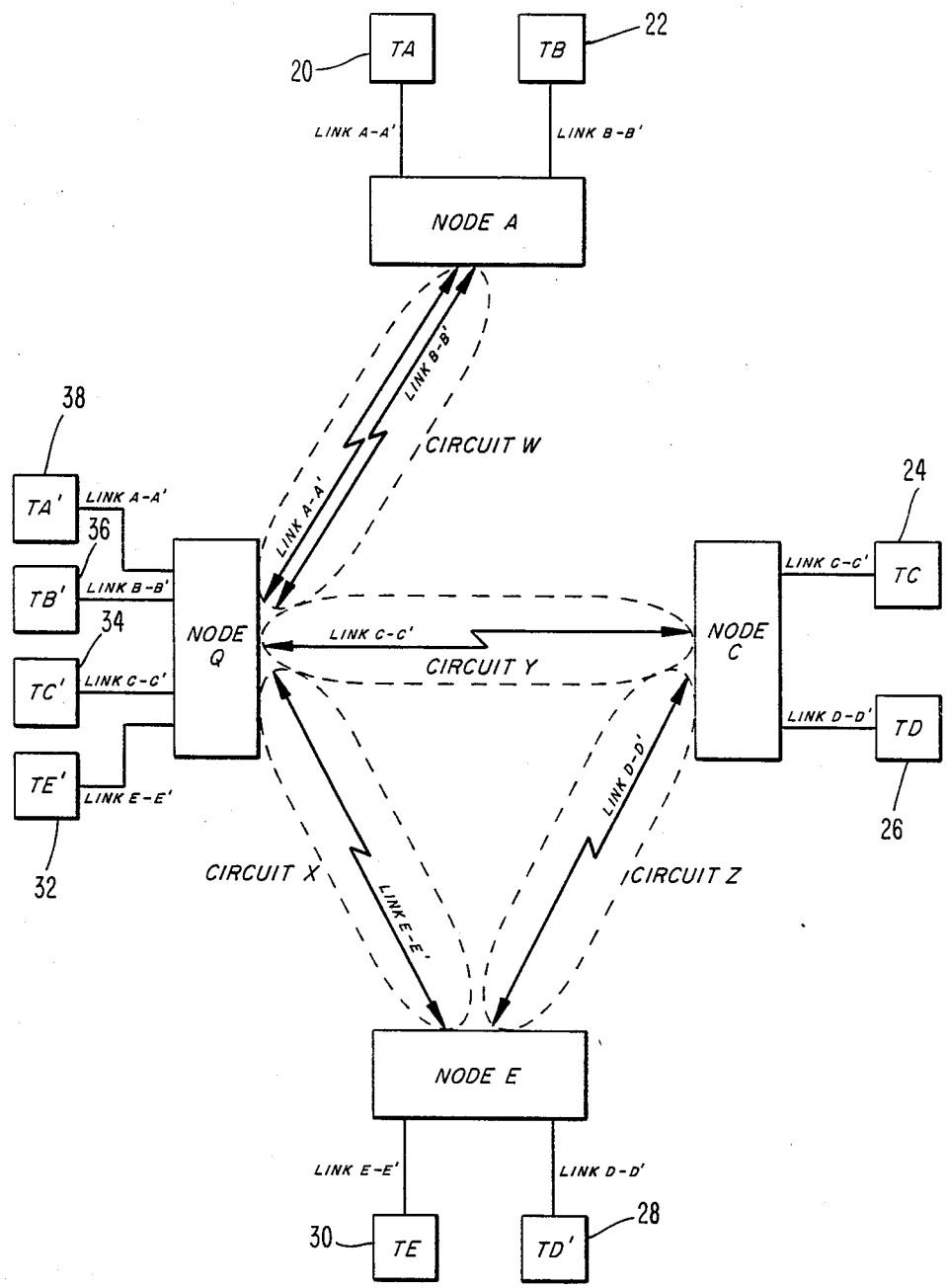
FIG. 25 is a virtual circuit diagram of the network of FIG. 1, showing circuits between the nodes of the network.

An example of the organization of the network of FIG. 1 in the preferred embodiment is shown in FIG. 25. As can be seen therein, each of the terminals 20–38 is associated with one other terminal via a link. For example, terminal 20 of node A is associated with terminal 38 of node Q over a link A-A'. Terminal 22 is associated, that is, communicates with, terminal 36 over a link B-B'. The set of links connecting node A to node Q, that is, link A-A' and link B-B', together form a circuit W. In a similar manner, the remaining nodes of the system each communicate with one other node through links, and the set of links connecting any two nodes constitutes a circuit. As can be seen in FIG. 25, a circuit X includes a single link E-E', a circuit Y includes a single link C-C' and a circuit Z comprises a single link D-D'.

Each circuit between a pair of nodes defines a communication path which assures data integritY over the communication channel and insures that a transmission sent by one node is received by the appropriate node and then passed on to the proper port. As a result, one node can be addressed by another via multiple Link Id Numbers over a single circuit.

As shown in FIG. 25, network 10 includes four circuits, W, X, Y, and Z, each comprised of one or more links. Circuit W has two links between node A and node Q, one of which connects ports A and A' and the other which connects ports B and B'. Although link ID numbers are permanently stored in the memory of each node, circuit numbers are arbitrarily assigned by the node during circuit initiation in the order in which theY are established.

There is, then, a one-to-one relationship between circuit numbers and nodes, and a ne to one relationship between I/O ports and link ID numbers. Thus, if a node has four ports, its link ID table contains four link ID numbers. If these four ports must communicate with terminals tied to four separate nodes, the Link Identifier Table contains four circuit numbers when all four communicating nodes are actively on the network.

The specific characteristics of links and circuits shown in FIG. 25 were defined when the particular network was designed. The configuration of a network is defined by a link ID table in each node, such as the link ID table for node Q in FIG. 24. There is an entry in the link ID table for each link associated with the node. Each entry includes a link ID and a circuit designator. The contents of the link ID entries are permanently stored in each node and the contents of the circuit designator are varied, depending upon whether the link is operational or not. That is, the circuit designator for each table entry is a zero until such time as transmission has been established between the terminals of the link. At such time, a circuit designator is entered.

There is a two-field entry in each node link ID table for each terminal associated with the node. The link ID field of each entry consists of a value uniquely identifying a terminal in another node which, together with the terminal associated in this node with the specific entry, defines a link. The link ID value includes a designation of the other node with which the link is associated. For example, the first entry of the link identifier table shown in FIG. 24 is associated with terminal 38 of this node Q. The value in the link ID field for this entry indicates that the other end of the link is associated with terminal 20 of node A. The second entry of the link identifier table of FIG. 24 corresponds to node 36 of node Q and the value stored in the associated link ID field specifies that the other end of the link is constituted by terminal 22 of node A. Similarly, the third and fourth entries of the link identifier table of FIG. 24 are associated with terminals 34 and 32, and the contents of the link identifier field of these entries specify that the other end of the respective links are constituted bY terminal 24 of node C and terminal 30 of node E. Each node interrogates its link ID table (FIG. 24) to determine that each link ID on the table has a valid circuit number. The lack of valid circuit numbers implies that circuit relationships have not been established with other nodes on the network.

Figure 26:
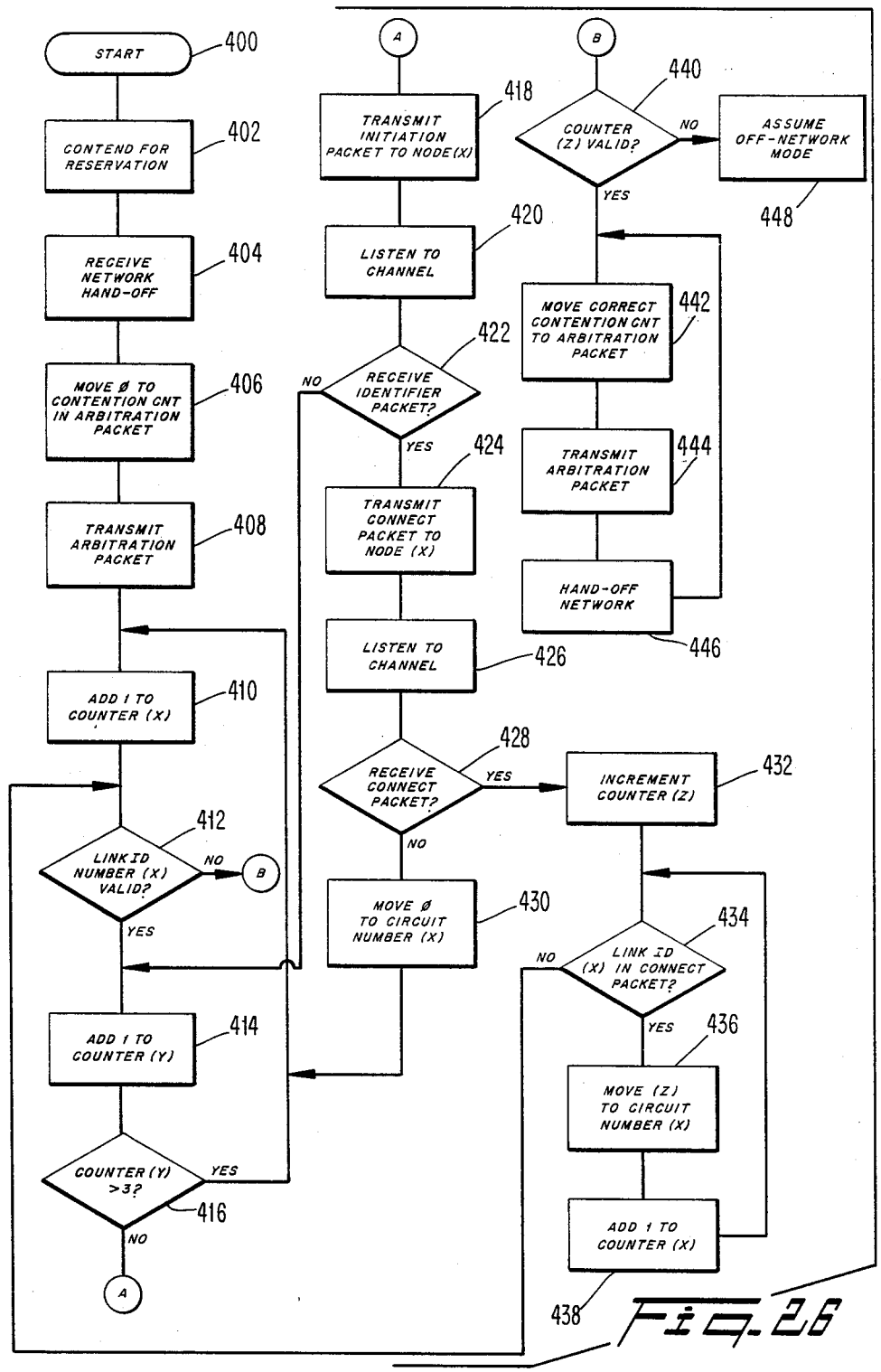
FIG. 26 is a logic flow diagram showing circuit initiation activity in a preferred embodiment of the method of the present invention.
Figure 27:
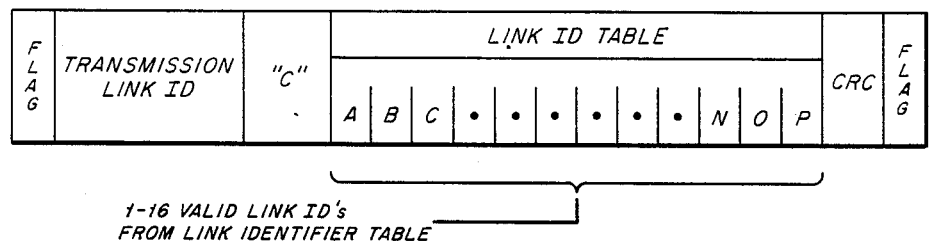
FIG. 27 is a diagram showing the structure of a Connect packet which may be transmitted using a preferred embodiment of the method of the present invention.

A logic flow diagram of circuit initiation is shown in FIG. 26, starting at block 400. If no circuits are established, a node gains temporary and absolute control of the network by contending for the network using established CEMA protocol techniques at block 402, receiving network hand-off at block 404, moving a zero to the contention count field of an Arbitration Packet at block 406, and transmitting an Arbitration packet at block 408 (FIG. 13) with a zero in the contention count field. A loop-through of the link ID table is performed at blocks 410–416, such that each Arbitration Packet is followed by an Initiation Packet (FIG. 8) at block 418 addressed to a node listed on its Link Identifier table. The node listens to the channel at block 420 and the destination node responds to the Initiation Packet by transmitting an Initiation Packet in return. If no Initiation packet is received at block 422, the originating node returns to block 414. Otherwise, the originating node receives the Initiation packet and transmits back to the destination node a Connect Packet (FIG. 27) at block 424 which contains a list of all nodes on its Link Identifier Packet with a list of nodes from its Link Identifier Table. The originating node listens to the channel at block 426 and, if no Connect Packet is received at block 428, returns through block 430 to the loop at block 410 Otherwise, the originating node loops through all circuits of the Link ID table, at blocks 432-438, comparing the list of link ID numbers listed in the packet against those listed in its link ID table. For every group of matching link ID numbers, a circuit is established and a number placed in the circuit number field of the link ID table, returning through block 412.

Figure 28:
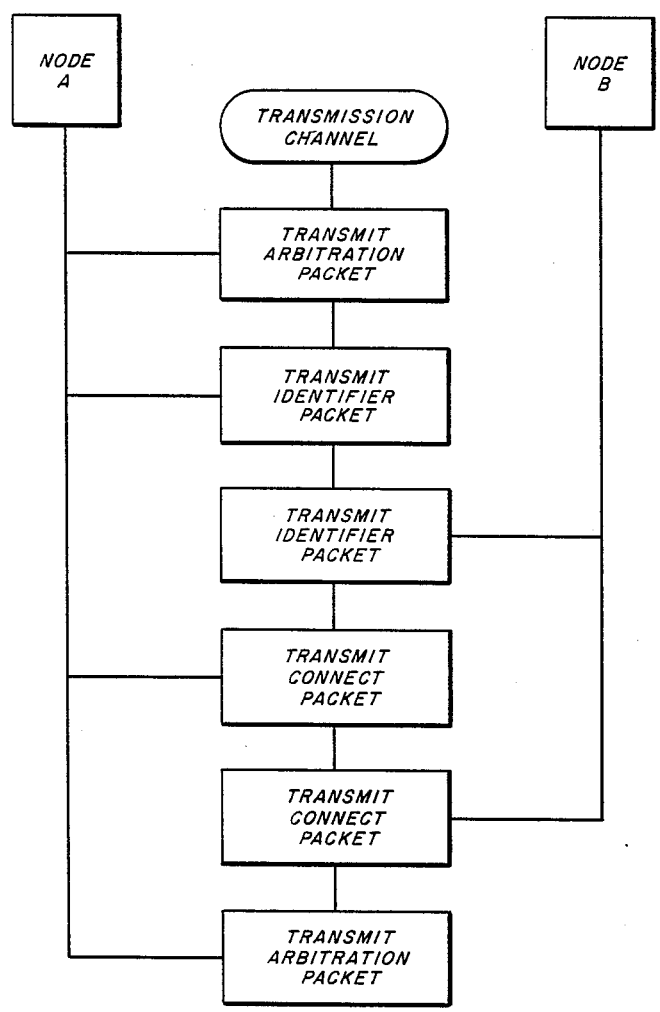
FIG. 28 is a logic flow diagram showing circuit initiation packet passing in a preferred embodiment of the method of the present invention.

The transmission exchange between originating and destination nodes is indicated at FIG. 28. It occurs outside the framework of normal CEMA activity and without the need for each node to contend for transmission reservations.

If the controlling node does not receive a response to an Initiation Packet after three transmission attempts, the node places a zero in the circuit number of the corresponding link ID number in its link ID table at block 430 signifying that a circuit has not been established and proceeds to the next node. A node retains control of the network until it has transmitted an Initiation Packet to all nodes listed in its link ID table.

When a node has interrogated all nodes listed on its link ID table either successfully or unsuccessfully, it moves a correct contention count to an Arbitration Packet at block 442, transmits another CEMA Arbitration Packet at block 444 handing-off control of the network to the next node on its pending Transmission Queue at block 446. If the node has not established a circuit with any node on its link ID table, as determined at block 440, it places itself off-network at block 448 until it receives a valid Initiation Packet from a node on its link ID table.

Any node coming onto the network for the first time and having no established circuits can take control of the network using circuit initiation techniques. This allows the link ID table to be dynamically changed during the process of network operation.

CEMA provides a high level of performance by the use of the following techniques: limiting the opportunity for transmission collision on the network to the time set aside for contention slots (less than 4% of the network time under load), dynamically optimizing the number of contention slots according to the load on the network which corresponds to demand for contention slots, putting all the traffic which can be transmitted from one node into one group of transmissions to multiple nodes, thereby reducing the number of transmission turnarounds, and allowing the transmission of variable length packets, thus eliminating the possible transmission of partially filled fixed length data packets.

Also contributing to overall efficiency are the features of controlling the transmissions on the network by rotating them using auto queues, ordering them via confirmation reservations, and producing a balanced sharing of the network facilities across all nodes through the use of dynamically allocated contention slots.

Further efficiencies are obtained by operating independently of data representation, packet formation and length or data transmission method.

SUMMARY OF FUNCTIONS

Newly Pending Transmissions

In the event that a node desires to make a transmission, CEMA protocol performs the following functions:

Randomly selects a contention slot and transmits a Reservation Request containing the ID of the node during the contention slot;

Verifies that the node ID is recognized in the following packet;

Keeps a Pending Transmission Queue of all node IDs which are recognized in all Arbitration Packets

Network Control Hand-off

After an Arbitration Packet specifies this node ID to be the next node responsible to take control of the network, the controlling node performs the following activities:

Receives the ID's placed by other nodes in the subsequent contention slots

Computes the Contention-Count

Transmits an Arbitration Packet specifying the ID of the next node to assume control of the network Includes in an Arbitration Packet new confirmations, reconfirmations, queue reconstruction confirmations, and auto-queued confirmations Manages the transmission frames of data packets Verifies that the next identified node takes control of the network after its transmission is completed Recovers control of the network if the next identified node does not take control as scheduled.

Network Idlinq

If the Pending Transmission Queue is empty, the network is placed into an idle status by the controlling node as follows:

Cycle between transmission of Arbitration Packets addressed to the node at the opposite end of the data circuit Receive contention slots until a request for transmission is made and control is handed-off to the requesting node

Network Activation

When it is necessary to activate an inactive network, the Aloha Protocol is employed as follows:

Random transmission of Aloha packets by all Network nodes until another node responds with an Aloha Recognition packet Assumption of control of network upon receipt of Aloha Recognition packet Communication using CEMA protocol

Circuit Initiation

When a node becomes active on the network but does not have a set of established circuit relationships, the node performs the following activities using Stop and Wait Protocol:

Gain control of the Network under CEMA by transmitting an Arbitration Packet with a zero in the contention-count field Transmit an Initiation packet to nodes on its link ID table until a node responds with an Initiation packet Transmit a Connect packet to the destination node Receive a Connect packet from the destination node Compare its Link identifier table to that in the Connect packet Establish circuits for each matching group of links on the respective Link Identifier tables When all nodes are interrogated, relinquish control to another node on the Network using CEMA protocol It will be apparent to those skilled in the art that various modifications and variations can be made in the method of the present invention without departing from the scope or spirit of the invention. Thus, it is intended that the present invention cover the modifications and variations of this invention provided they come within the scope of the appended claims and their equivalents.

We claim:

1. A method for transmitting application data between a plurality of communication nodes each having a unique identifier, said nodes being interconnected via a communications channel to form a network such that transmission from any of the nodes is supplied simultaneously to others of the nodes, the method comprising:
   designating a first node as a control node defined as a node having control of said channel;
   transmitting reservation requests during a contention period, reservation requests each comprising a signal from a node desiring to transmit over said channel, said contention period comprising a predetermined time period during which simultaneous transmissions from a plurality of nodes are permitted to occur on the network;
   transmitting network control data, which specifies a second node to subsequently become the control node and derived from said reservation requests, from said first node;
   transmitting application data from said control node; and designating said second node as the control node.

2. A method as recited in claim 1 wherein said step of transmitting network control data from said first node includes the step of transmitting a signal identifying the node specified to next obtain control of said channel.

3. A method for transmitting application data between a plurality of communication nodes each having a unique identifier, said nodes being interconnected via a communications channel to form a network, the method comprising:
   designating a first node as a control node defined as a node having control of said channel;
   transmitting reservation requests during a predetermined time period from nodes desiring to transmit over said channel;
   transmitting network control data, specifying a second node to subsequently become the control node and derived from said reservation requests, from said first node;
   transmitting application data from said control node;
   designating said second node as the control node; and
   storing in all nodes a data structure determining the order in which nodes will obtain control of said channel;
   wherein said step of transmitting network control data from said first node includes the step of transmitting a signal identifying the node specified to next obtain control of said channel.

4. A method as recited in claim 3 wherein said step of transmitting a signal includes the step of transmitting an identifier associated with the node specified to next obtain control of said channel, and said step of storing in all nodes a data structure determining the order in which nodes will obtain control of said channel includes the step of storing in all nodes a queue of identifiers arranged in the order in which nodes associated with said queued identifiers will obtain control of said channel.

5. A method as recited in claim 4 wherein said queue comprises a migrating window.

6. A method as recited in claim 1 wherein said step of transmitting network control data from said first node includes transmitting reservation confirmations consisting of the identifiers of nodes from which reservation requests have been successfully received by said first node during said predetermined time period.

7. A method for transmitting application data between a plurality of communication nodes each having a unique identifier, said nodes being interconnected via a communications channel to form a network, the method comprising:
   designating a first node as a control node defined as a node having control of said channel;
   transmitting reservation requests during a predetermined time period from nodes desiring to transmit over said channel;
   transmitting network control data from said first node, said network control data being derived from said reservation requests, and said network control data including reservation confirmations consisting of the identifiers of nodes from which reservation requests have been successfully received by said first node during said predetermined time period, and an identifier associated with a second node specified to next obtain control of the channel;
   transmitting application data from said control node;
   designating said second node as the control node; and
   storing said reservation confirmations in queues of all of said nodes, said queues being arranged in the order in which nodes associated with aid queued identifiers will obtain control of said channel, thereby determining the order in which nodes will obtain control of said channel.

8. A method as recited in claim 1 wherein the step of transmitting network control data from said first node includes the step of transmitting the position for storage, within said queues of all of said nodes, of said identifiers of nodes from which reservations requests have been successfully received.

9. A method as recited in claim 7 further comprising the steps of:
   determining whether said queue of said first node contains the identifier of a node from which a reservation request has been successfully received; and
   transmitting at least one node identifier by said first node from said first node queue if said first node queue contains the identifier of a node from which a reservation request has been successfully received.

10. A method as recited in claim 7 further comprising the step of:
    determining the identifier of an auto-queue node comprising a node which will require access to said channel; and
    wherein said step of transmitting network control data from said first node to specify a second node to subsequently become the control node includes transmitting reservation confirmations consisting of the identifiers of auto-queue nodes.

11. A method as recited in claim 7 further comprising the steps of:
    determining whether a node desires to transmit over said channel;
    determining, if said node desires to transmit over said channel, whether the identifier of said node is in said queue of said node; and
    transmitting a reservation request only if the identifier of said node is not in said queue of said node.

12. A method as recited in claim 3 further comprising the steps of:
    transmitting reservation confirmations consisting of the identifiers of nodes from which reservation requests have been successfully received by said first node; and transmitting reservation confirmations consisting of the identifiers of nodes from which reservation requests had previously been successfully received by said first node.

13. A method as recited in claim 1 comprising the step of transmitting network control data and application data from a second node specified to subsequently obtain control including the substeps of:

monitoring said channel by said first node to determine if network control information has been transmitted by said second node; and if no network control data has been transmitted by said second node, retransmitting network control data from said first node to specify said second node to next assume control of said channel.

14. A method as recited in claim 13 comprising the additional step of transmitting network control data specifying a node other than said second node to next assume control of said channel if no network control data is transmitted from said second node after said retransmission.

15. A method as recited in claim 4 wherein said step of transmitting a signal identifying the node specified to next obtain control of said channel includes the substep of transmitting the next entry in said queue of said first node as the node specified to next obtain control of said channel.

16. A method as recited in claim 15 wherein, if the next entry in said queue of said first node is not a valid node identifier, said substep of transmitting the identifier of the node specified to next obtain control of said channel includes the substep of transmitting a null character as the identifier of the node specified to next obtain control of said channel.

17. A method as recited in claim 16 wherein, if said first node transmits a null characters as the identifier of the node specified to next obtain control of said channel, the method further comprises the steps of:

examining the respective queues by each of said nodes to determine the identifier present as the first entry of said respective queues; and assuming control of said channel by the node whose identifier is the first entry in said queue.

18. A method as recited in claim 1 wherein said step of designating a first node as a control node includes the steps of:

monitoring said channel by all nodes;

transmitting, on a random delay basis, data from all nodes to another of said nodes;

transmitting, from a node successfully receiving one of said randomly delayed transmissions, response data to the one of said nodes from which a randomly delayed transmission was received;

designating as said first node said one of said nodes from which a randomly delayed transmission was received; and transmitting network control data from said first node.

19. A method for transmitting data between a plurality of communication nodes each having an identifier and interconnected via a communications channel, the method comprising:

initiating reservation request transmissions during one of a plurality of contention time periods after the completion of data transmission from a first node, the reservation request transmissions being initiated by each node desiring to generate a data transmission over the channel;

maintaining in each of the nodes a pending transmission queue specifying the order of transmission of nodes desiring to generate a data transmission over the channel;

monitoring the channel, by the node specified by the pending transmission queue to next generate a data transmission over the channel, to receive the reservation request transmissions;

transmitting network control data containing reservation confirmations consisting of the identifiers of nodes from which reservation request transmissions were received;

storing the transmitted identifiers in the pending transmission queue of each node; and transmitting data from the node specified by the pending transmission queue to next generate a data transmission over the channel.

20. A method for transmitting application data between a plurality of communication nodes, the nodes being interconnected via at least one communication channel to form a network, wherein a transmission from one of the nodes is supplied simultaneously to others of the nodes, the method comprising:

designating one of the nodes as a control node defined as a node having control of said channel;

transmitting reservation requests from a plurality of the nodes during a first period, the reservation requests each comprising a signal identifying a node desiring to transmit application data over the network, and the first period comprising a predetermined period of time during which simultaneous transmissions from a plurality of the nodes are permitted to occur on the network;

receiving the reservation requests in the control node;

deriving network control information from reservation requests received in the control node, the network control information including information specifying the order in which nodes will become the control node; and transmitting the network control data from the control data over the network a second period in which simultaneous transmissions on the network from a plurality of the nodes are not permitted.

* * * * *